United States Patent
Cruzado et al.

(10) Patent No.: US 9,007,182 B2
(45) Date of Patent: Apr. 14, 2015

(54) PROTECTING PACKAGES FROM TAMPERING

(75) Inventors: Edwin D. Cruzado, Plant City, FL (US);
William J. Dalzell, Parrish, FL (US);
Keith A. Souders, Tampa, FL (US)

(73) Assignee: Honeywell International Inc.,
Morristown, NJ (US)

( * ) Notice: Subject to any disclaimer, the term of this patent is extended or adjusted under 35 U.S.C. 154(b) by 669 days.

(21) Appl. No.: 13/397,020

(22) Filed: Feb. 15, 2012

(65) Prior Publication Data

US 2013/0207783 A1 Aug. 15, 2013

(51) Int. Cl.
*H04Q 5/22* (2006.01)
*G08B 13/14* (2006.01)
*B65D 6/28* (2006.01)
*G06F 21/86* (2013.01)
*G06K 19/07* (2006.01)
*G06K 19/073* (2006.01)
*H05K 5/02* (2006.01)

(52) U.S. Cl.
CPC ............... *G06F 21/86* (2013.01); *G06K 19/07* (2013.01); *G06K 19/073* (2013.01); *G06K 19/07372* (2013.01); *H05K 5/0208* (2013.01)

(58) Field of Classification Search
CPC ......... G06F 21/86; G06F 21/35; G06F 21/40; G06F 21/77; G06K 19/07; G06K 19/073; G06K 19/07372; B65D 88/022; B65D 88/121; B65D 88/129; B65D 88/54; B65D 90/48
See application file for complete search history.

(56) References Cited

U.S. PATENT DOCUMENTS

| | | |
|---|---|---|
| 6,357,007 B1 | 3/2002 | Cromer et al. |
| 7,061,382 B2 | 6/2006 | Claessens et al. |
| 7,274,289 B2 | 9/2007 | Kerr et al. |
| 7,348,887 B1 | 3/2008 | Warner et al. |
| 7,644,290 B2 | 1/2010 | Ransom et al. |
| 7,712,674 B1 | 5/2010 | Warner et al. |
| 7,839,289 B2 | 11/2010 | Chung et al. |

(Continued)

FOREIGN PATENT DOCUMENTS

| | | |
|---|---|---|
| DE | 102007048423 A1 | 4/2009 |
| WO | 2001/69524 A2 | 9/2001 |
| WO | 2006/026365 A2 | 3/2006 |

OTHER PUBLICATIONS

Combined Search and Examination Report from counterpart Great Britain application No. GB1302293.4, dated Jul. 12, 2013. 5 pages.

(Continued)

*Primary Examiner* — George Bugg
*Assistant Examiner* — Renee Dorsey
(74) *Attorney, Agent, or Firm* — Shumaker & Sieffert, P.A.

(57) ABSTRACT

A package includes a chassis, a plurality of components arranged within the chassis, a plurality of RFID devices, and at least one processing device. The RFID devices are arranged at a plurality of locations to form an array configured to authenticate compliance of the actual configuration of the package with a model configuration. The processing device is configured to communicate with the RFID devices, determine if the actual configuration of the package is in compliance with the model configuration based on communications with the RFID devices, and set an operational mode of one or more of the components of the package in response to determining if the actual configuration of the package is in compliance with the model configuration.

20 Claims, 6 Drawing Sheets

(56) References Cited

U.S. PATENT DOCUMENTS

| | | |
|---|---|---|
| 8,026,816 B2 | 9/2011 | Chao Cheng |
| 2007/0271596 A1* | 11/2007 | Boubion et al. .................. 726/3 |
| 2008/0033368 A1* | 2/2008 | Fago ............................ 604/189 |
| 2012/0181270 A1* | 7/2012 | Smith .......................... 220/4.27 |

OTHER PUBLICATIONS

Response to Examination Report dated Jul. 12, 2013, from counterpart Great Britain Patent Application No. 1302293.4, filed Feb. 11, 2014, 10 pp.

* cited by examiner

PROTECTING PACKAGES FROM TAMPERING

TECHNICAL FIELD

The present disclosure relates to detecting and protecting against tampering of a package and its constituent components.

BACKGROUND

Packages, such as electronic packages, may contain components that are of a sensitive nature. For example, an electronics component of an electronics package may comprise circuitry that the manufacturer or a customer would like to prevent from being inspected, repaired, removed, or replaced by unauthorized parties.

SUMMARY

In general, this disclosure is directed to protecting packages against tampering. In one example, a package includes a chassis, a plurality of components arranged within the chassis, a plurality of radio frequency identification (RFID) devices, and at least one processing device. The RFID devices are arranged at a plurality of locations to form an array configured to authenticate compliance of the actual configuration of the package with a model configuration. The at least one processing device is configured to communicate with the RFID devices, determine if the actual configuration of the package is in compliance with the model configuration based on communications with the RFID devices, and set an operational mode of one or more of the components of the package in response to determining if the actual configuration of the package is in compliance with the model configuration.

In another example, a method includes arranging a plurality of RFID devices at a plurality of locations on or within a chassis of a package to form an array configured to authenticate compliance of the actual configuration of the package with a model configuration, communicating with the RFID devices, determining if the actual configuration of the package is in compliance with the model configuration based on communications with the RFID devices, and setting an operational mode of one or more components of the package in response to determining if the actual configuration of the package is in compliance with the model configuration.

In another example, a computer-readable storage medium includes instructions executable by a programmable processor to cause the processor to communicate with a plurality of RFID devices arranged at a plurality of locations on or within a chassis of a package to form an array configured to authenticate compliance of the actual configuration of the package with a model configuration, determine if the actual configuration of the package is in compliance with the model configuration based on communications with the RFID devices, and set an operational mode of one or more components of the package in response to determining if the actual configuration of the package is in compliance with the model configuration.

In another example, a method includes initializing a plurality of processing nodes respectively associated with a plurality of components of a package, transmitting a key split from each of the processing nodes to a key manager module executed by at least one processing device of the package, assembling, by the key manager module, a plurality of key spits of a threshold number of the processing nodes to define an encryption/decryption key, decrypting a configuration file associated with each of the processing nodes with the encryption/decryption key, and authenticating a configuration of one or more of the plurality of processing nodes based on one or more of the decrypted configuration files.

In another example, the disclosure is directed to an article of manufacture comprising a computer-readable storage medium. The computer-readable storage medium comprises computer-readable instructions for execution by a processor. The instructions cause a programmable processor to perform any part of the techniques described herein. The instructions may be, for example, software instructions, such as those used to define a software or computer program. The computer-readable medium may be a computer-readable storage medium such as a storage device (e.g., a disk drive, or an optical drive), memory (e.g., a Flash memory, read only memory (ROM), or random access memory (RAM)) or any other type of volatile or non-volatile memory that stores instructions (e.g., in the form of a computer program or other executable) to cause a programmable processor to perform the techniques described herein. The computer-readable medium may be nontransitory.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
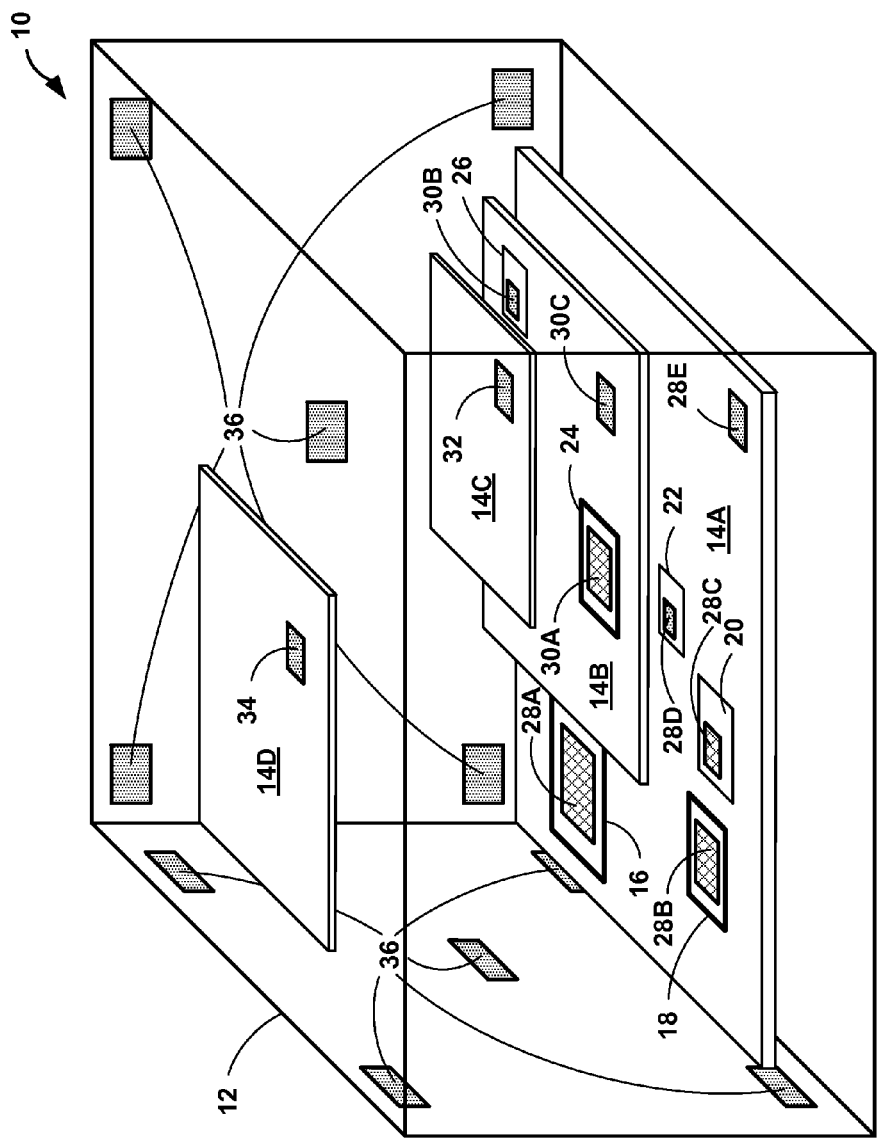
FIG. 1 is a schematic diagram showing an example package including an array of RFID devices associated with different components of the package.

In general, the present disclosure is directed to devices, systems, and methods for determining whether a package and/or a component of a package has been tampered with. The term "package," as used herein, may refer to any package, system, structure, collection, compilation, assortment, array, or arrangement of individual components, wherein one or more of the individual components may move with respect to one or more of the other components. The term "component" as used herein may refer to any assembly, sub-assembly, individual component, part, piece, member, portion, element, constituent, module, device, apparatus, equipment, machine, mechanism, instrument, or contrivance that may form a part of a package. Packages, such as electronics packages, may include components that a manufacturer or customer does not wish to be inspected or otherwise handled in any manner by unauthorized users. For example, the components may include proprietary data, intellectual property, or confidential information, such as classified information to which access is restricted by law or regulation to particular groups of persons. Thus, it may be desirable to automatically detect when a package has been tampered with and, in some examples, take an action to help prevent meaningful access to the components of the package or the information held by the components.

Some proposed package tamper protection or prevention techniques have included physical barriers to opening a package and/or removing or adding components of the package.

However, such techniques may include a number of disadvantages including, e.g., reparability issues after the package has been opened, increased part count and package complexity, and increased weight, size, and materials.

Additionally, some proposed package tamper protection or prevention techniques have included the use of sensors to detect unauthorized handling of a protected package. However, some existing tamper sensors can be expensive, e.g., because of the structure of the sensors and because the sensors must be designed specifically for a particular package such that mass production is impractical. In addition, existing tamper sensors can have known vulnerabilities, which can decrease the effectiveness of the sensors in detecting tampering with the package.

There are a number of levels at which a package may be protected from tampering. For example, the physical volume defined by the chassis of a package, e.g., the space within all sides of the chassis may be protected from being opened by unauthorized personnel. Additionally, the authenticity of components of a package may be verified and any unauthorized, removal, replacement, or addition of such components may be protected against. Moreover, the particular configuration of the components of the package, e.g. software version, operating parameters, etc., may be protected from unauthorized changes. In many cases, it may be desirable to protect the authenticity of all of these levels of a package substantially simultaneously (e.g., simultaneously or nearly simultaneously).

Examples according to this disclosure are directed to devices, systems, and methods for protecting a package and components thereof from tampering. The disclosed examples include protection of the physical volume defined by a package, protection of components of the package, including assemblies, subassemblies, and piece-parts, and protection of the authenticity of the configuration of each of the components in a package. Any of these different levels of protection may be used individually or in any combination with one another.

In one example, the physical volume and presence of a predetermined set of components of a package are protected from tampering. In such examples, radio frequency identification (hereinafter "RFID") devices are arranged at a plurality of locations on or in the package to form an array configured to authenticate compliance of the actual configuration of the package with a model configuration. The model configuration may include a package configuration prescribed by, e.g., an original equipment manufacturer, which may include a prescribed configuration of the chassis that defines the physical volume of the package and a prescribed configuration of the components within the chassis of the package. A processing device included in the protected package or otherwise associated with the protected package can be configured to communicate with the RFID devices, determine if the actual configuration of the package is in compliance with the model configuration based on communications with the RFID devices, and set an operational mode of one or more of the components of the package in response to determining if the actual configuration of the package is in compliance with the model configuration.

The processing device that is employed to interrogate the RFID devices and determine the actual configuration of the package may be a number of different types of devices arranged and configured in a number of different ways. For example, one or more microprocessors may be included in the package and may be configured to communicate with and execute instructions or hardware level functions to authenticate the configuration of the package in accordance with the disclosed examples. In general, the processing device may be a variety of different types of devices implemented in whole or in part in software, hardware, or combinations thereof. For example, the processing device may include microprocessors, digital signal processors (DSPs), application specific integrated circuits (ASICs), field programmable gate arrays (FPGAs), or any other equivalent integrated or discrete logic circuitry, as well as any combinations of such components, embodied in electronics included in a protected package according to this disclosure. The processing device may be a dedicated device added to the package for purposes of tamper protection, or, in another example, may be one of the components of the package being protected. Additionally, or instead, in some examples, the processing device may be included in one or more of the RFID devices.

In some examples, the configuration of the package that is meant to be compliant with a model configuration may include, e.g., the configuration of the chassis that defines the physical volume of the package. In one example, some of the RFID devices are arranged at predetermined locations on or within the chassis of the package to form a virtual volume that simulates the physical volume defined by the chassis. Such examples according to this disclosure may provide a reduced cost and flexible solution for securing a package and the components within the package, e.g., electronics, from tampering.

Currently, some active volume protection of packages from tampering is designed around concerns with materials, size and weight of the volume and the attachment mechanism (e.g. physical barrier to entry into package chassis) and securing method. Examples according to this disclosure that function to provide a virtual volume may reduce cost compared to some existing active volume protection systems by reducing part count, reducing or eliminating reparability issues with opening the volume, and reducing material costs because a bulky chassis and additional attachment mechanisms may not be necessary to protect the package including virtual volume protection.

In another example, the configuration of the package that is meant to be compliant with a model configuration may include the configuration of the components within the chassis of the package. In one example, some of the RFID devices are associated with the components of the package, e.g., one RFID device can be associated with a respective one of the components. It is noted that in examples according to this disclosure, one RFID device may be associated with multiple components and more than one RFID device may be associated with a single component. In any event, the RFID devices associated with the components of the package may be employed to verify the presence of all the components in the package, e.g., detect whether any components have been removed by unauthorized personnel. For example, the processing device of the tamper protection system may be configured to communicate with the RFID devices associated with each of the components of the package and detect the absence of one or more of the components based on the communication with the RFID devices. In some examples, the RFID devices associated with the components may be employed to authenticate the component, e.g., authenticate the actual component in the package is an original equipment manufacturer (OEM) component and not a counterfeit, and authenticate the configuration of the component, e.g., authenticate the software version currently installed for the component.

Many challenges may arise for securing packages due to the manufacturing, assembly, service and repair being outsourced to contracted companies in both the continental United States and foreign countries. For example, counterfeit, used components, or both, may be substituted for authentic components, and control and detection of such substitutions may be difficult, even with the most elaborate accounting methods. The discovery of these component substitutions may lead to expensive repairs, a need for partial or complete re-manufacturing of the package, or a sub-optimal package or package unsuitable for its intended purpose. Simply marking parts and subassemblies may not ensure unauthorized substitutions have not taken place. Additionally, unauthorized servicing that may compromise the integrity of the package can be an issue in that the products may not be properly maintained and may be out of specification or calibration. Examples according to this disclosure are thus directed at improving control of manufacture, service, and repair of protected packages by electronically tagging assemblies, subassemblies, and piece-parts of packages and employing processing devices to monitor and identify the components in a quick and accurate manner and also authenticate the proper configuration of individual components.

In addition to or in lieu of employing RFID devices arranged at a number of different locations on or in a package to form an array configured to authenticate compliance of the actual configuration of the package with a model configuration, as described above, examples according to this disclosure also include the use of encrypted configuration files associated with each component of a package in conjunction with encryption key splitting (also known as secret sharing) to self-authenticate and cross-authenticate the components and thereby authenticate the package based on the contents of the configuration files. In one example, a package includes a number of components included in which are a number of processing nodes. A processing node may include, for example, a processing device and memory. A configuration file is associated with each processing node in the package and includes information related to the proper configuration of that node, e.g. software loads, software version numbers, programmable logic version numbers, component identification numbers, pass keys for inter-processing node communications, component and package service information, service information tags for all of the processing nodes, and service information validation codes for other processing nodes. The processing nodes may compare their own configuration, e.g., compare one or more values indicating the configuration of the processing node stored in the memory of the node, to the configuration file to self-authenticate their own configuration. In some examples, one processing node may communicate information related to the configuration of the processing node to another processing node, which may then employ the configuration file of the second processing node and the message from the first processing node to confirm the authenticity of the configuration of the first processing node.

Before executing the authentication routine to validate the configuration of individual components and the entire package, however, the configuration files of the processing nodes need to be decrypted. As such, each processing node in the package includes a key split, e.g., stored in memory of the node, which may be assembled with other key splits from other processing nodes to generate an encryption/decryption key to decrypt the configuration files of the processing nodes.

In one example, processing nodes associated with components of a package are initialized. Each of the processing nodes of the package may provide a key split to a key manager module, which may, in one example, be executed by a processing device of the package (e.g. included in or separate from the processing nodes). The key manager module may assemble the key splits of a threshold number of the processing nodes to define an encryption/decryption key, which may be employed to decrypt a configuration file associated with each of the processing nodes of the package. One of the processing nodes may validate its configuration with the decrypted configuration file for that processing node. The processing node may also transmit a validation message to another processing, which may validate the configuration of the first processing node with the validation message and/or the decrypted configuration file for the other processing node.

FIG. 1 is a conceptual diagram illustrating an example electronics package 10 including a plurality of components. Electronics package 10 may be protected against tampering by employing one or more of a number of different example tamper protection techniques according to this disclosure. For example, electronics package 10 includes a number of different RFID devices, which, as described in greater detail below, may include passive, active, and battery-assisted RFID devices, as well as RFID readers, transponders, and receivers. In any case, the RFID devices of electronics package 10 may be arranged at locations on or in electronics package 10 to form an array configured to authenticate compliance of the actual configuration of the package with a model configuration. One or more processing devices of electronics package 10 may communicate with the RFID devices to authenticate the configuration of the package.

In some examples, authenticating the configuration of electronics package 10 may include detecting any changes or unauthorized access to the physical volume defined by package 10 and/or authenticating the presence and configuration of one or more of the components of package 10. In addition to the foregoing techniques for protecting electronics package 10 from tampering, one or more processing nodes of electronics package 10 may use encrypted configuration files associated with each node in conjunction with encryption key splitting to self-authenticate and cross-authenticate components of the package and thereby authenticate the package based on the contents of the configuration files.

In FIG. 1, electronics package 10 includes chassis 12 defining a chamber within which a number of components are arranged. The components of electronics package 10 may include assemblies, sub-assemblies, piece-parts, etc. For example, chassis 12 may be one component of electronics package 10 that is configured to be protect against tampering, e.g., by protecting against unauthorized access to the physical volume of package 10 defined by chassis 12. Additionally, in the example shown in FIG. 1, electronics package 10 includes a plurality of electronics cards 14A-14D (collectively "electronics cards 14" or "cards 14"), which may be, for example, printed boards. In another example according to this disclosure, a package like electronics package 10 may include more or fewer components like cards 14.

Each of cards 14 may include any number and/or combination of electronics devices, including, e.g. processing devices, volatile and non-volatile memory, bridge and other circuitry, and the like. For example, in the example shown in FIG. 1, electronics card 14A includes processors 16 and 18, field programmable gate array (hereinafter "FPGA") 20, and memory 22. In addition, electronics card 14B includes processor 24 and memory 26. Thus, example electronics package 10 includes a plurality of components including chassis 12, cards 14, processors 16, 18, and 24, FPGA 20, memory 22, and memory 26. In another example, a package in accordance with this disclosure may include more or fewer components that the package is configured to protect against tampering.

Electronics cards 14 may be electrically interconnected and/or connected to other circuitry such that collectively, electronics cards 14 form a functional electronics package 10.

For example, electronics cards 14 and other components of package 10 may form a fiber optic gyroscope employed in commercial and military aviation applications. In another example, electronics cards 14 and other components of package 10 may form an electronic heads-up display employed by pilots or other operators in commercial and military aviation applications.

In one example, one or more of electronics cards 14 may be mounted within a card rack (not shown) that is mounted to chassis 12. A card rack in such cases may include a number of slots configured to receive and hold one of the electronics cards 14 in fixed positions relative to each other. Slots of a card rack that receive electronics cards 14 may each also include one or more electrical connectors that provides an electrical interconnection between any number of combinations of two or more electronics cards 14 of package 10, or an electrical connection between a respective electronics card 14 and other circuitry within or outside of chassis 12. In one example, electronics cards 14 may interconnected electrically or otherwise by a number of different means other than a card rack and/or slots in such a rack.

Regardless of the particular components and function of package 10, in some examples, the configuration of each electronics card 14, or of electronics cards 14 collectively, as well as the overall configuration of package 10 may be proprietary such that the manufacturer or end user may desire to prevent unauthorized tampering of the package or its constituent components. Tampering may include, for example, unauthorized physical access to the contents of chassis 12, unauthorized removal of one or more components of package 10, unauthorized substitution of one or more components of package 10, and the like. In one example, therefore, electronics package 10 is configured to protect against tampering of the package and/or the components thereof at a number of different levels of granularity. To this end, example electronics package 10 of FIG. 1 includes a plurality of RFID devices, e.g., RFID devices 28A-28E associated with electronics card 14A, arranged at a plurality of locations on or within chassis 12. The RFID devices of electronics package 10 may be configured in examples according to this disclosure to authenticate compliance of the actual configuration of package 10 with a model configuration. The configuration of electronics package 10 may be authenticated at a number of different levels of granularity in the sense that the RFID devices may be employed to protect, e.g., the physical volume defined by chassis 12, as well as to detect the presence and authenticity of one or more of cards 14, processors 16, 18, and 24, FPGA 20, memory 22, and memory 26 (or other components, should package 10 include other components in other examples).

In the example of FIG. 1, electronics package 10 includes an array of RFID devices respectively associated with different components of the package including cards 14, processors 16, 18, and 24, FPGA 20, memory 22, and memory 26. One or more RFIDs associated with one or more components of a package, as described in this disclosure, includes, e.g., physically connecting an RFID to particular component and by virtue of the connection authenticating the configuration of the package or components thereof. Additionally, associating RFID devices to components includes, for example, employing one or more RFID devices to authenticate the presence and/or configuration of one or more components of a package. In such examples, an RFID device need not be physically connected to a particular component to be associated with the component for purposes of tamper protection in accordance with this disclosure.

In the example of FIG. 1, RFID device 28A is associated with processor 16 on electronics card 14A, RFID device 28B is associated with processor 18 on electronics card 14A, RFID device 28C is associated with FPGA 20 on electronics card 14A, RFID device 28D is associated with memory 22 on electronics card 14A, and RFID device 28E is associated with electronics card 14A. Additionally, RFID device 30A is associated with processor 24 on electronics card 14B, RFID device 30B is associated with memory 26 on electronics card 14B, and RFID device 30C is associated with electronics card 14B. RFID device 32 is associated with electronics card 14C and RFID device 34 is associated electronics card 14D.

Additionally, in the example of FIG. 1, a plurality of RFID devices 36 are associated with chassis 12. It should be noted that RFID devices 36 are illustrated as distributed on only two walls of chassis 12 for the sake of the clarity of the illustration in FIG. 1. However, in some examples, more than two walls (e.g., all of the side walls, top wall, and bottom wall) of chassis 12 may include RFID devices to form an array that simulates the physical volume defined by the chassis. For purposes of the following description of example electronics package 10, it will be assumed that RFID devices 36 associated with chassis 12 are distributed over all of the side walls, top, and bottom of the chassis to form an array that simulates the physical volume of package 10. Moreover, although each wall of chassis 12 in the example of FIG. 1 is associated with five RFID devices 36, in other examples, a greater or fewer number of RFID devices may be employed in association with a chassis of a package including more or fewer than five RFID devices for each wall of the chassis.

In the following examples describing techniques for protecting electronics package 10 and other packages from tampering, it may be assumed that the package has been configured in accordance with a particular OEM specification and that this original configuration serves as a model configuration against which later comparisons of the actual configuration of the package are made. As described above, in some examples, the model configuration may include a prescribed configuration of the chassis that defines the physical volume of the package and a prescribed configuration of the components within the chassis of the package, including the prescribed number and type of components as well as specific identifiable components. For example, when originally manufactured and assembled, an OEM may configure hardware, software, memory, and other components of electronics package 10 according to a predetermined arrangement of particular components, including chassis 12, electronics cards 14, processors 16, 18, and 24, FPGA 20, memory 22, and memory 26. Additionally, the OEM may configure electronics package 10 with a predetermined number and arrangement of RFID devices associated with various components of package 10. As will be explained in detail below, this model configuration prescribed by the OEM of package 10 is encoded in various ways into the package, e.g., into various components of the package, such that the package is configured to self-authenticate upon initialization at various times after leaving the control of the OEM, e.g., after being shipped to a customer that purchases the package.

After leaving the control of the OEM, electronics package 10 may be passed between a number of parties and locations. For example, electronics package 10 may be sold to another manufacturing company that assembles package 10 into another product, e.g., an aircraft engine or an aircraft, and then sells the product including package 10 to an end user. This process of transferring electronics package 10 may include not only assembling the package into a product and putting it into service/operation, but also maintenance and service of the package at various times during its operational life. At any one of these points at which electronics package changes hands or is subject to service and/or maintenance, there may be a risk of tampering. Regardless of the number of places and parties package 10 goes through after leaving the OEM, however, at some later time electronics package 10 may be powered up and go into an initialization routine. Upon initialization, electronics package 10 is configured in accordance with the examples of this disclosure to self-authenticate the configuration of the package and execute one or more functions based on the results of the authentication process. For example, electronics package 10 may be configured to disable one or more components of the package in the event it determines that the actual configuration is not in compliance with the model configuration prescribed by the OEM.

Additionally, organizations and personnel may be authorized by the OEM to service and maintain the protected package, e.g. package 10 of FIG. 1 over time. As such, the model configuration originally prescribed by the OEM may be updated periodically based on service and/or maintenance executed by authorized servicing organizations. For example, an authorized servicer may be able to access and alter package 10 such that any changes made to the package, including configuration and component changes, are built into the model configuration against which later comparisons of the actual configuration of the package are made. For example, a model configuration file for package 10 as a whole and/or for one or more individual components of the package may be stored in memory of the package, e.g. memory 22 and/or memory 26. The model configuration may be stored in encrypted form such that only personnel authorized by the OEM of package 10 and in possession of the correct encryption/decryption key may service the package and components thereof and then subsequently update the model configuration to reflect such changes. In the event, package 10 were serviced by unauthorized personnel, whatever changes were made to the package and/or components of the package would not be reflected in the model configuration file(s) and, as such, would be automatically detected by one or more of the tamper protection measures according to examples of this disclosure.

In one example, RFID devices 36 associated with chassis 12 of electronics package 10 are arranged at a plurality of predetermined locations on the chassis to form a virtual volume that simulates the actual physical volume defined by the chassis. For example, RFID devices 36 may be arranged on chassis 12 such that a space between RFID devices 36 substantially equals (e.g., equals or nearly equals) the physical volume defined by chassis 12. As an example, RFID devices 36 may be arranged to define virtual walls that are positioned along the outer surfaces of chassis 12. One or more processing devices of electronics package 10 are configured to communicate with RFID devices 36 and detect removal or rearrangement of any of RFID devices 36 from the respective predetermined locations of each device on chassis 12, and thereby detect unauthorized tampering with chassis 12. For example, processing devices of electronics package 10 may be configured to communicate with RFID devices 36 to detect unauthorized physical intrusion into chassis 12 by virtue of detecting penetration or rearrangement of the virtual volume defined by RFID devices 36. The processing device(s) of electronics package 10 may also be configured to set the operational mode of one or more components of electronics package 10, e.g., disable operation of one or more of the components of the package or set one or more of the components of the package to operate in a reduced functionality mode in response to detecting the removal or rearrangement of any of RFID devices 36 from the respective predetermined locations of each device on chassis 12.

The processing device or devices that communicate with the RFID devices of electronics package 10 and execute functions in response to such communications may include a number of different devices in examples according to this disclosure. For example, any one or more of processors 16, 18, and 24 of electronics package 10 may be configured to communicate with the RFID devices of package 10 and execute functions in response to such communications. In one example, FPGA 20 may be configured to communicate with the RFID devices of package 10 and execute functions in response to such communications. Additionally, some of the RFID devices of electronics packages may include a processing device, which, in some examples, may control communication with other RFID devices and execute functions in response to such communications. Particular examples are provided below with regard to communications with the RFID devices of electronics packages 10 and functions executed in response thereto. However, the examples are illustrative only and many different types and combinations of devices may be employed to carry out these functions to protect packages against tampering in accordance with this disclosure.

In one example including virtual volume protection of electronics package 10 using RFID devices 36 associated with chassis 12, processor 16 of electronics card 14A is configured to communicate with RFID devices 36 and determine if chassis 12 has been tampered with based on the communications. In some examples, processor 16 determines if chassis 12 has been tampered with by determining if all of the RFID devices 36 are present (e.g., by comparing the unique identification codes for RFID devices 36 to stored data). For example, processor 16 may be directly connected to RFID device 28A on electronics card 14A. RFID device 28A may be an RFID reader configured to communicate with and identify other RFID devices. In one such example, upon initialization of electronics package 10, e.g., upon powering up the package, processor 16 may be configured to communicate with RFID device 28A to cause the device to communicate with and interrogate RFID devices 36 associated with chassis 12. RFID device 28A, which in this example is an RFID reader is capable of, and upon instruction from processor, transmitting radio frequency (hereinafter "RF") signals to RFID devices 36 to, e.g., request that devices 36 respond with the unique identification code for each of the devices. In such an example, RFID device 28A may receive the unique identification code of each of RFID devices 36 and communicate that information to processor 16.

Processor 16 may compare the unique identification codes of each of RFID devices 36 received from RFID device 28A against, e.g., a configuration file including the identification codes of the RFID devices associated with chassis 12 in the model configuration of electronics package 10 prescribed by the OEM. In one example, processor 16 may retrieve the configuration file from memory 22 on electronics card 14A or another memory of package 10. However, in another example, processor 16 may retrieve the configuration file from other locations/memory, including, e.g., memory included in processor 16, memory 26 on electronics card 14B or another memory source of electronics package 10 or outside of package 10. In any event, processor 16 may determine based on the comparison between the unique identification codes of each of RFID devices 36 received from RFID device 28A and the identification codes of the RFID devices associated with chassis 12 in the model configuration whether one or more RFID devices prescribed by the model configuration are completely missing or have been substituted with other, e.g., used or counterfeit RFID devices. In one example, such missing or substituted RFID devices indicated by the comparison executed by processor 16 may be interpreted as unauthorized tampering with package 10.

In another example, processor 16 and/or other devices of package 10 may be configured to determine if RFID devices 36 are arranged in the correct locations defined in the model configuration prescribed by the OEM of electronics package 10. The location of RFID devices 36 can be determined using a number of techniques, including, e.g. triangulating the position of each of RFID devices 36 using a plurality of other RFID devices included in electronics package 10 and analyzing the power signature or other characteristics of signals transmitted between each of RFID devices 36 and another RFID device of electronics package 10, e.g., the time it takes for one of RFID devices 36 to respond to a signal sent to the device by another RFID device. Regardless of the particular manner in which processor 16 and/or other processing devices of electronics package 10 determine the actual location of each of RFID devices 36, in one example, processor 16 may then compare the actual locations of RFID devices 36 to predetermined locations of a list of RFID devices defined in the model configuration as associated with chassis 12 of electronics package 10. Based on the comparison, processor 16 may determine if the virtual volume of electronics package 10 defined by RFID devices 36 is in compliance with the arrangement defined in the model configuration prescribed by the OEM of the package.

In the event that processor 16 determines that one or more of RFID devices 36 associated with chassis 12 have been removed or rearranged based on the communications between, e.g., RFID device 28A and devices 36, processor 16 may execute one or more functions in response to the detection of possible tampering with electronics package 10. For example, processor 16 may disable operation of one or more of the components of electronics package 10 or set one or more of the components of the package to operate in a reduced functionality mode in response to detecting the removal or rearrangement of any of RFID devices 36 associated with chassis 12. For example, electronics card 14A may be a main or motherboard of electronics package 10 and processor 16 may be a central processing unit (CPU) of the package. Processor 16 may be configured to disable all of the peripheral boards of electronics package 10, e.g., electronics cards 14B-14D, while maintaining a limited number of functions on electronics card 14A. For example, processor 16 may set cards 14 and components thereof to operate such that electronics cards 14B-14D are disabled, while processors 16, 18, and FPGA 20 on electronics card 14A may still execute functions in conjunction with information stored on memory 22 to communicate the detection of possible tampering with electronics package 10 to authorized repair personnel diagnosing and servicing the package.

Processor 16 may also be configured to generate a notification (e.g., an alert) indicating that the actual configuration of electronics package 10 is out of compliance with the model configuration prescribed by the OEM in response to detecting the removal or rearrangement of any of RFID devices 36 associated with chassis 12. For example, processor 16 may be configured to cause a component of electronics package 10 to vibrate or display a visual alert including, e.g., by emitting light from a light emitting diode (LED) or other display on package 10 to alert operators to the possibility of tampering with the package. Processor 16 may also be configured to issue an audible alert, text-based alert including, e.g., text message or e-mail, or graphical alert. In this manner, processor 16 may be configured to trigger an audible, visual, or tactile notification indicating that the actual configuration of electronics package 10 is out of compliance with the model configuration prescribed by the OEM in response to detecting the removal or rearrangement of any of RFID devices 36 associated with chassis 12. The notification generated by processor 16 may be transmitted to a remote user in examples, while in other examples, the notification is more local to, e.g., the users within a sensory range (e.g., within ear shot, visible range, or somatosensory range) of package 10.

The process by which processor 16 communicates with RFID devices 36 and detects possible tampering with chassis 12 of electronics package 10 based on the communications, as indicated above, may be executed by other processing devices of the package. For example, FPGA 20 may be configured to control RFID device 28C to query RFID devices 36 for unique identification codes and then compare the codes received from devices 36 to a configuration file stored in memory 26 and including the codes for the RFID devices in the model configuration of package 10 prescribed by the OEM.

In some examples, the functions described above as executed by processor 16 to authenticate the virtual volume defined by RFID devices 36 may be repeated and thus cross-checked by other processing devices of electronics package 10. In one example, processor 16 may compare the unique identification codes of RFID devices 36 to the codes in the configuration file and determine that the configuration of RFID devices 36 is in compliance with the model configuration prescribed by the OEM of electronics package 10. Processor 16 may then transmit a validation message to another processing device of electronics package 10, e.g., to processor 18 on electronics card 14A indicating that processor 16 authenticated the configuration of RFID devices 36, which may cause processor 18 to repeat the authentication of RFID devices 36. Processor 18 may execute the redundant authentication of the configuration of RFID devices 36 in a number of ways.

In one example, the validation message transmitted by processor 16 to processor 18 not only functions to trigger processor 18 to begin the authentication process, but also includes the unique identification codes of RFID devices 36 from the communications between RFID device 28A and devices 36 described above. In this case, processor 16 may, instead of communicating with RFID devices 36 a second time, compare the unique identification codes included in the validation message to a different configuration file stored in a different location than the file used by processor 16, e.g., a redundant configuration file stored in memory included in a microchip also including processor 16. The configuration file referenced by processor 18 includes the unique identification codes for RFID devices associated with chassis 12 in the model configuration prescribed by the OEM of electronics package 10 against which the unique identification codes of RFID devices 36 may be compared.

In another example, however, processor 18 may repeat the authentication of RFID devices 36, and thereby the virtual volume of electronics package 10, in substantially the same manner as described above for processor 16, including communicating with RFID devices 36 again to determine the unique identification codes of the devices. However, processor 18 may cause RFID device 28B, instead of RFID device 28A used by processor 16, to communicate with RFID devices 36 to retrieve the unique identification codes of the devices. This cross-checking or redundant authentication of the configuration of RFID devices 36 may be repeated any number of times by different processing devices to determine whether or not electronics package 10, and, in this example, chassis 12 may have been tampered with.

In addition to or in lieu of the virtual volume protection of electronics package 10 using RFID devices 36 associated with chassis 12 described above, components within package 10 may also be associated with RFID devices (e.g., a respective RFID device) and protected against tampering using such devices. Individual component configuration authentication for electronics package 10 may be executed at a number of different levels. In one example, the presence or absence of the correct components of electronics package 10 based on the model configuration prescribed by the OEM of package 10 may be detected to determine whether the package may have been tampered with. In one example, in addition to the presence of all the correct components in electronics package 10, the package may be configured to authenticate the particular configurations of individual components, e.g., software builds, software versions, operational parameter settings, and the like.

In one example, the RFID devices associated with each of the components of electronics package 10 are employed to authenticate the component configuration of the package. For example, RFID devices 28A-28E associated with processors 16 and 18, FPGA 20, memory 22, and electronics card 14A may be employed to detect the presence or absence of the card 14A and/or one or more of the components on the card. Additionally, RFID devices 30A-30C associated with processor 24, memory 26, and electronics card 14B may be employed to detect the presence or absence of the card 14B and/or one or more of the components on the card. Finally, in the example of FIG. 1, RFID device 32 may be employed to detect the presence or absence of electronics card 14C and RFID device 34 may be employed to detect the presence or absence of electronics card 14D. In a similar manner as described above with reference to authenticating the physical volume of electronics package 10 defined by chassis 12, one or more processing devices of package 10 may be configured to communicate with RFID devices 28A-28E, 30A-30C, 32, and 34 and detect the presence or absence of any of the RFID devices, and thereby detect unauthorized tampering with the components associated with the RFID devices.

In a similar manner as described above with reference to virtual volume protection employing RFID devices 36, a number of different devices may function to authenticate the presence of the correct components in electronics package 10 using RFID devices 28A-28E, 30A-30C, 32, and 34. Any one or more processing devices included in electronics package 10, including, e.g. processors 16, 18, and 24, FPGA 20, and/or processing devices included in any of the RFID devices of package 10 may be employed to authenticate the presence of the correct components in electronics package 10 using RFID devices 28A-28E, 30A-30C, 32, and 34.

The processing device(s) of electronics package 10 may also be configured to set the operational mode of one or more components of electronics package 10, e.g. disable operation of one or more of the components of the package or set one or more of the components of the package to operate in a reduced functionality mode in response to detecting the absence of one or more of the correct components in package 10 or detecting the presence of one or more incorrect components in the package.

Additionally, in a similar manner as described above, the processing device or devices that communicate with RFID devices 28A-28E, 30A-30C, 32, and 34 of electronics package 10 and execute functions in response to such communications may generate an alert indicating that the actual configuration of the components of electronics package 10 is out of compliance with the model configuration prescribed by the OEM in response to detecting the absence of one or more of the correct components or detecting the presence of an incorrect component in package 10. For example, the processing device(s) may be configured to trigger an audible, visual, or tactile notification indicating that the actual configuration of the components of electronics package 10 is out of compliance with the model configuration prescribed by the OEM.

In one example of authenticating the component configuration of electronics package 10, processor 16 of electronics card 14A is configured to communicate with RFID devices 28A-28E, 30A-30C, 32, and 34 and determine if one or more of the components associated with the RFID devices has been tampered with based on the communications. In one example, processor 16 is directly connected to RFID device 28A on electronics card 14A. RFID device 28A may be an RFID reader configured to communicate with and identify other RFID devices. In one such example, upon initialization of electronics package 10, e.g., upon powering up the package, processor 16 may be configured to communicate with RFID device 28A to cause the device to communicate with RFID devices 28B-28E, 30A-30C, 32, and 34 respectively associated with processor 18, FPGA 20, memory 22, electronics card 14A, processor 24, memory 26, electronics card 14B, electronics card 14C, and electronics card 14D. RFID device 28A, which is an RFID reader is capable of and upon instruction from processor 16 does transmit RF signals to RFID devices 28B-28E, 30A-30C, 32, and 34 to interrogate the RFID devices, e.g., request that each RFID device respond with the unique identification code for that device. In such an example, RFID device 28A may receive the unique identification code of each of RFID devices 28B-28E, 30A-30C, 32, and 34 and communicate the codes to processor 16.

Processor 16 may compare the unique identification codes of each of RFID devices 28B-28E, 30A-30C, 32, and 34 received from RFID device 28A against, e.g., a configuration file including the identification codes of the RFID devices associated with processor 18, FPGA 20, memory 22, electronics card 14A, processor 24, memory 26, electronics card 14B, electronics card 14C, and electronics card 14D in the model configuration of electronics package 10 prescribed by the OEM. In one example, processor 16 may retrieve the configuration file from memory 22 on electronics card 14A. However, in another example, processor 16 may retrieve the configuration file from other locations/memory, including, e.g., memory included in a microchip that includes processor 16, memory 26 on electronics card 14B or another memory source of electronics package 10 or electrically connected to package 10 in some examples.

Either before or after causing RFID device 28A to communicate with RFID devices 28B-28E, 30A-30C, 32, and 34, processor 16 may also communicate with RFID device 28A to request the unique identification code for that device and authenticate this code against the code in the configuration file that includes the model configuration of electronics package 10 prescribed by the OEM. As this process includes processor 16 authenticating itself, in one example, another processing device of electronics package 10 may communicate with RFID device 28A to request the unique identification code for that device and authenticate this code against the code in a configuration file that includes the model configuration of electronics package 10 prescribed by the OEM.

In the foregoing manner, the unique hardware identification codes of each of RFID devices 28A-28E, 30A-30C, 32, and 34 are employed to serialize the associated components of electronics package 10, processor 16, processor 18, FPGA 20, memory 22, electronics card 14A, processor 24, memory 26, electronics card 14B, electronics card 14C, and electronics card 14D. In other words, the unique identification code of each RFID device associated with each component of electronics package 10 is employed as a proxy to uniquely identify that component. In another example, however, the actual unique identification codes of each of the hardware components processor 16, processor 18, FPGA 20, memory 22, electronics card 14A, processor 24, memory 26, electronics card 14B, electronics card 14C, and electronics card 14D may be employed to authenticate the component configuration of electronics package 10.

For example, instead of processor 16 or another processing device of electronics package 10 causing one or more RFID devices to query all of the RFID devices associated with the components of the package for the unique identification codes of the RFID devices, the RFID devices could be configured to query the individual components of the package for the unique identification code of each component. In one example, processor 16 may be configured to communicate with RFID device 28A to cause the device to communicate with, e.g., RFID device 28C associated with FPGA 20. RFID device 28C, however, instead of returning its own unique identification code, can be configured to determine the unique identification code, e.g., the serial number of FPGA 20 and transmit this information to RFID device 28A. Processor 16 may then compare the serial number received by RFID device 28A from RFID device 28C against a serial number in the configuration file including the model configuration of electronics package 10 prescribed by the OEM. This process may be repeated for any number of the components of electronics package 10.

The process by which processor 16 communicates with RFID devices 28A-28E, 30A-30C, 32, and 34 and detects possible tampering with processor 16, processor 18, FPGA 20, memory 22, electronics card 14A, processor 24, memory 26, electronics card 14B, electronics card 14C, and electronics card 14D of electronics package 10 based on the communications, as indicated above, may be executed by other processing devices of the package. For example, FPGA 20 may be configured to control RFID device 28C to query RFID devices 28A, 28B, 28D, 28E, 30A-30C, 32, and 34 for unique identification codes and then compare the codes to a configuration file stored in memory 26 and including the codes for the RFID devices in the model configuration of package 10 prescribed by the OEM.

Moreover, the functions described above as executed by processor 16 to authenticate the component configuration of electronics package may be repeated and thus cross-checked by other processing devices of package 10. In one example, processor 16 may compare the unique identification codes of RFID devices 28A-28E, 30A-30C, 32, and 34 to the codes in the configuration file and determine, based thereon, that the component configuration of electronics package 10 is in compliance with the model configuration prescribed by the OEM of package 10. Processor 16 may then transmit a validation message to another processing device of electronics package 10, e.g. to processor 18 on electronics card 14A indicating that processor 16 authenticated the component configuration of electronics package 10 by communications with RFID devices 28A-28E, 30A-30C, 32, and 34 and configured to trigger processor 18 to repeat the authentication process. Processor 18 may execute the redundant authentication of the component configuration of electronics package 10 using similar techniques as described above with reference to virtual volume authentication, including, e.g., completely repeating the authentication process carried out by processor 16 or employing information included in the validation message from processor 16 to authenticate the component configuration of package 10.

Instead of, or in addition to, authenticating the presence of the correct components in electronics package 10, other information related to the component configuration of package 10 may be authenticated in examples according to this disclosure. For example, configuration parameters affecting the manner in which components of electronics package 10 function may be authenticated, including, e.g., authenticating software version and build numbers and operation parameter set points of the components of the package. For example, any of the components of package 10, e.g. processor 16 of electronics card 14A may be associated with a service information tag, which may be stored on memory of the component or of RFID 28A associated with processor 16. Service information tags may include an identifier that represents the serial number or other unique identification code of the component, e.g. processor 16 combined with configuration settings, like a sequence of bits that encode information about processor 16 such as processor type, main memory size, non-volatile storage size, firmware versions, and the like. The service information tag for processor 16, or other components of package 10, may be updated and modified whenever package 10 is serviced and may then be authenticated against the configuration settings prescribed by the model configuration for package 10.

In one example, processor 16 of electronics card 14A is configured to authenticate the operational configuration of a number of components of electronics package 10, e.g., processors 18 and 24, FPGA 20 and authenticate its own configuration. As described above, processor 16 may be configured to communicate with RFID device 28A to cause the device to communicate with RFID devices 28B, 28C, and 30A associated with processor 18, FPGA 20, and processor 24, respectively. Upon instruction or initiation from processor 16, RFID device 28A transmits RF signals to RFID devices 28B, 28C, and 30A to, e.g., to interrogate each RFID device, which may each respond to RFID device 28A with configuration information regarding processor 18, FPGA 20, and processor 24, respectively.

In some of these examples, RFID devices 28B, 28C, and 30A may include a processing device and memory. The memory included in each of RFID devices 28B, 28C, and 30A may store, among other information, configuration information for each of processor 18, FPGA 20, and processor 24, respectively. For example, the memory included in each of RFID devices 28B, 28C, and 30A may store the software version and build numbers for each of processor 18, FPGA 20, and processor 24, respectively. As such, in one example, upon request from RFID device 28A, RFID devices 28B, 28C, and 30A may retrieve the software version and build numbers for processor 18, FPGA 20, and processor 24, respectively, and return this configuration information to RFID device 28A in response to the interrogation by RFID device 28A. RFID device 28A may communicate the software version and build information for processor 18, FPGA 20, and processor 24 to processor 16. Processor 16 may compare the configuration information received from RFID device 28A to a configuration file including the correct software version and build numbers for processor 18, FPGA 20, and processor 24 according to the model configuration of package 10 prescribed by the OEM. In one example, processor 16 may retrieve the configuration file from memory 22 on electronics card 14A. However, in another example, processor 16 may retrieve the configuration file from other locations/memory, including, e.g., memory included in a microchip that includes processor 16, memory 26 on electronics card 14B or another memory source of electronics package 10 or electrically connected to electronics package 10.

In another example, instead of RFID devices 28B, 28C, and 30A retrieving the software version and build numbers for processor 18, FPGA 20, and processor 24, respectively from memory included in the respective RFID devices, each of RFID devices 28B, 28C, and 30A may request (e.g., by transmitting a request signal) the configuration information from each of the associated components, i.e., each of processor 18, FPGA 20, and processor 24, respectively. Processor 18, FPGA 20, and processor 24 may be configured to return configuration information to RFID devices 28B, 28C, and 30A, respectively, including returning the software version and build numbers for each of the components. RFID devices 28B, 28C, and 30A may return the configuration information to RFID device 28A, which may communicate the software version and build information for processor 18, FPGA 20, and processor 24 to processor 16. Processor 16 may then compare the configuration information received from RFID device 28A to a configuration file including the correct software version and build numbers for processor 18, FPGA 20, and processor 24 according to the model configuration of package 10 prescribed by the OEM.

As with other examples described above, the process by which processor 16 communicates with RFID devices 28A-28C and 30A and authenticates configuration information for processor 18, FPGA 20, and processor 24, as indicated above, may be executed by other processing devices of electronics package 20. Moreover, the functions described above as executed by processor 16 to authenticate the component configuration of electronics package 10 may be repeated and thus cross-checked by other processing devices of package 10. And, as also noted above, examples by which processor 16 or another device of electronics package 10 authenticates configuration information for components of the package may include authenticating information other than software version and build numbers. For example, operation parameter set points of the components of electronics package 10 may be authenticated.

In addition to or in lieu of employing RFID devices 28A-28E, 30A-30C, 32, and 34 to authenticate compliance of the actual configuration of components of electronics package 10 with a model configuration, as described above, examples according to this disclosure also include the use of encrypted configuration files associated with each component of a package in conjunction with encryption key splitting to self-authenticate and cross-authenticate the components of the package and thereby authenticate the package based on the contents of the configuration files. The components of electronics package 10 may be considered as including a number of processing nodes. A processing node may include, for example, a processing device and memory. With reference to electronics package 10, processors 16, 18, and 24, alone or in conjunction with memory 22 and 26 may be considered processing nodes. Additionally, FPGA 20 in conjunction with memory 22 on electronics card 14A may be considered a processing node. It is noted that any of RFID devices 28A-28E, 30A-30C, 32, and 34 including a processing device and memory may also be considered a processing node. However, the following examples of encrypted configuration files may be employed independent of the use of or need for one or more RFID devices in electronics package 10.

As described above, in some examples, a configuration file is associated with each processing node in electronics package 10 and includes information related to the proper configuration of that node. The processing nodes of electronics package 10 may compare their own configuration, e.g. compare one or more values indicating the configuration of the processing node stored in the memory of the node, to the configuration file to self-authenticate their own configuration. Additionally, one processing node may communicate information related to the configuration of the processing node to another processing node, which may then employ the configuration file of the second processing node and the message from the first processing node to confirm the authenticity of the configuration of the first processing node. Before executing the authentication routine to validate the configuration of individual components of and the entire electronics package 10, however, the configuration files of the processing nodes need to be decrypted. As such, each processing node in electronics package 10 includes a key split, e.g. stored in memory of the node, which may be assembled with other key splits from other processing nodes to generate an encryption/decryption key to decrypt the configuration files of the processing nodes.

In one example employing encrypted configuration files, processors 16, 18, and 24, and FPGA 20 each include a processing node of electronics package 10. Each of processors 16, 18, and 24, and FPGA 20 may be configured with integrated memory or may function in conjunction with one or more of memory 22 on electronics card 14A and memory 26 on electronics card 14B to form a processing node. At some point in time, e.g., upon powering up electronics package 10, each of processors 16, 18, and 24, and FPGA 20 are initialized. Upon initialization, each of processors 16, 18, and 24, and FPGA 20 of electronics package 10 may provide a key split to a key manager module, which may, in one example, be executed by a processing device of the package (e.g. included in or separate from the processing nodes) or may be implemented in hardware, software, or combinations thereof as a separate component in the package.

The key manager module of electronics package 10, however implemented, may assemble the key splits of a threshold number of processors 16, 18, and 24, and FPGA 20 to define an encryption/decryption key. In some examples, the threshold number of key splits of the processing nodes of electronics package 10 necessary to define the encryption/decryption key will be equal to the number of processing nodes. In other words, in some examples, all of the key splits are required to define the encryption/decryption key. However, in one example, less than all of the key splits from the processing nodes may be employed to define the encryption/decryption key. In one example, assembling the key splits of processors 16, 18, and 24, and FPGA 20 may include concatenating the key splits of each component to define the encryption/decryption key. In another example, the key manager module of electronics package 10 may execute another algorithm that employs the key splits of processors 16, 18, and 24, and FPGA 20 to define the encryption/decryption key, e.g. the algorithm generates an encryption/decryption key that is based on but does not necessarily include the key splits of the individual components of the package. The key manager module may then provide the encryption/decryption key to each of processors 16, 18, and 24, and FPGA 20 to enable each processing node to decrypt the respective configuration files for each node.

In one example, a key split employed by processing nodes, e.g. processors 16, 18, and 24, and FPGA 20 of package 10 is a quantity that is encrypted multiple times, e.g. an Advanced Encryption Standard (AES) wrapped key could be a 192 bit encrypted quantity that, once unwrapped would include a 128 bits of key material.

In one example, the key manager module generates and transmits the encryption/decryption key to processor 16. Processor 16 employs the key to decrypt a configuration file stored on memory 22, which includes information related to a model configuration for processor 16 prescribed by the OEM of electronics package 10. After decrypting the configuration file, processor 16 compares the current configuration of the processing node including processor 16 to the configuration information included in the decrypted configuration file to determine if the processing node including processor 16 is in compliance with the model configuration prescribed by the OEM. For example, processor 16 may determine any software loads executed during manufacture and/or service or repair of electronics package 10, software version and build numbers, component identification numbers, like serial numbers for the processing node, e.g. for processor 16 and memory 22. In the event processor 16 determines that the actual configuration of the processing node is in compliance with the model configuration as reflected in the decrypted configuration file, processor 16 may be configured to transmit a validation message to another processing node of electronics package 10 in order to cause another processing node to cross-check the authenticity of the configuration of the processing node including processor 16.

As part of the decryption of the configuration file for components of package 10 and the authentication of the configuration of the components, a Message Authentication Code (MAC) tag may be employed. A MAC tag may be generated by a MAC algorithm, sometimes called a cryptographic hash function, which may accept an encryption key as an input and an arbitrary-length message to be authenticated, and output the MAC tag. The MAC tag may function to protect both the data integrity and authenticity of the message by allowing verifiers also possessing the encryption key to detect any changes to the message content. In examples according to this disclosure, the MAC tag and the message could be stored in the configuration file for various processing nodes of package 10 and could be authenticated using the same or another encryption/decryption key used for encrypting/decrypting the configuration files. If any of the processing nodes determine that a MAC tag included in an associated configuration file is not the correct value, this could function to prevent one or more processing nodes of package 10 from becoming operational or could cause the processing node(s) to operate in a limited functionality mode.

In one example, electronics package 10 is configured such that processing nodes that are directly connected, e.g., processing nodes on the same electronics card, are configured to cross-check the authenticity of one another using encrypted configuration files. For example, processor 16 may be configured to transmit a validation message to processor 18 on electronics card 14A in order to cause the processing node including processor 18 to cross-check the authenticity of the configuration of the processing node including processor 16. In this example, processor 16 and processor 18 may be directly connected on electronics card 14A. In another example, however, one or more of RFID devices 28A-28E, 30A-30C, 32, and 34 may be employed to communicate between processing nodes on different electronics cards of package 10, e.g., between processor 16 on electronics card 14A and processor 24 on electronics card 14B.

The validation message, however transmitted, from processor 16 may include information that enables another processing node of electronics card 10 to cross-check the authenticity of the configuration of the processing node including processor 16. For example, all of the information determined by processor 16 regarding the actual configuration of the processing node including processor 16 may be transmitted in the validation message. Additionally, in some examples, the validation message and other communications between components of electronics package 10 may be secure. In such cases, the validation message from processor 16 may include a pass key or other credentials for secure inter-processing node communications.

In any event, the processing node to which processor 16 transmits the validation message may be configured to compare the actual configuration of the processing node including processor 16 to the model configuration included in the decrypted configuration file for that processing node to authenticate the configuration of the processing node including processor 16. For example, processor 16 may be configured to transmit the validation message to a processing node of electronics package 10 including FPGA 20. In this example, FPGA 20 receives the validation message and first authenticates the message as from processor 16 by checking the pass key transmitted by processor 16 with the message. If FPGA 20 determines the correct pass key is provided in the validation message, FPGA 20 may compare the actual configuration of the processing node including processor 16 to a model configuration in accordance with information in a configuration file stored on memory associated with FPGA 20, which configuration file was previously decrypted by FPGA 20 using the encryption/decryption key provided by the key manager module of electronics package 10. The processing node including FPGA 20 may thus be employed to cross-check the authenticity of the configuration of the processing node including processor 16. The foregoing process of authentication and cross-authentication of processing nodes of electronics package employing encrypted configuration files decrypted by a key assembled from key splits from each processing node may be repeated as necessary to authenticate the configuration of all of the processing nodes of electronics package 10, e.g., all of the processing nodes including processors 16, 18, and 24, and FPGA 20.

In the event it is determined that any of the processing nodes of electronics package 10 are out of compliance with the model configuration prescribed by the OEM (e.g., using the techniques described above), processor 16 or another processing device of electronics package 10 may execute one or more functions in response to the detection of possible tampering with electronics package 10. For example, processor 16 may disable operation of one or more of the components of electronics package 10 or set one or more of the components of the package to operate in a reduced functionality mode in response to detecting that any of the processing nodes of package 10 are not configured in accordance with the parameters prescribed by the OEM. Processor 16 or another component of electronics package 10 may also be configured to generate a notification that indicates that the actual configuration of electronics package 10 is out of compliance with the model configuration prescribed by the OEM in response to determining that the actual configuration of one or more of the processing nodes of package 10 is not in compliance with the model configuration. For example, processor 16 may be configured to trigger an audible, visual, or tactile alert indicating that the actual configuration of electronics package 10 is out of compliance with the model configuration prescribed by the OEM.

At least some of the foregoing examples have been described as carried out, at least in part, by processor 16 or another processing device that is also an operational component of electronics package 10. However, in some examples, some tamper protection functions in accordance with examples of this disclosure may be executed completely by one or more of the RFID devices included in electronics package 10. For example, any one of RFID devices 28A-28E, 30A-30C, 32, and 34 may include a processing device that is configured to carry out the functions described above as executed by processor 16 or another processing device that is also an operational component of electronics package 10. Additionally, to the extent necessary as described above, any one of RFID devices 28A-28E, 30A-30C, 32, and 34 may also include memory storing information for authenticating the configuration of electronics package 10, including, e.g., information related to the model configuration of package 10 prescribed by the OEM.

Figure 2A:
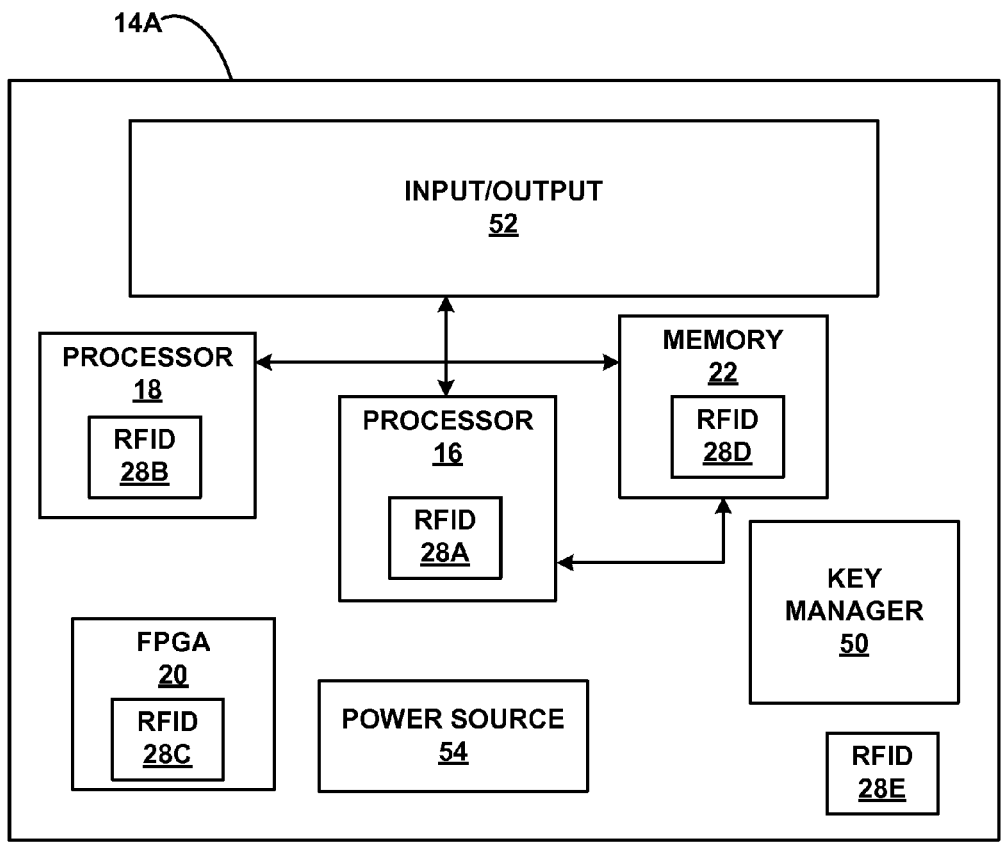
FIG. 2A is a schematic diagram of an example of an electronics card of the package of FIG. 1.
Figure 2B:
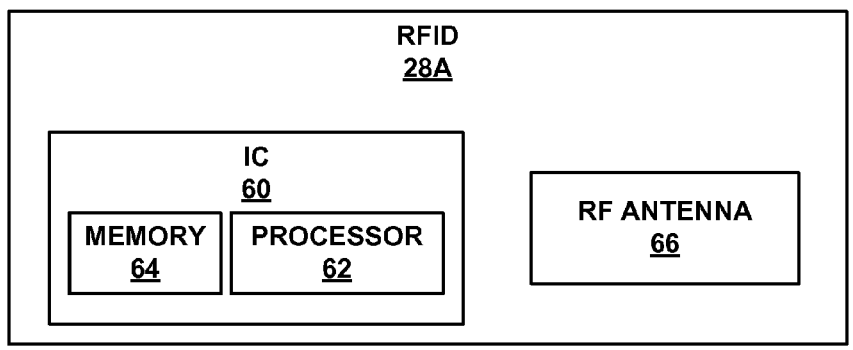
FIG. 2B is a schematic diagram of an example of an RFID device of the package of FIG. 1.

Additional details regarding how the foregoing functions for protecting electronics package 10 against tampering may be implemented are described below with reference to FIGS. 2A and 2B, which are schematic diagrams of electronics card 14A and an example configuration of RFID device 28A associated with processor 16 on electronics card 14A. FIG. 2A is a schematic diagram of electronics card 14A including processor 16, processor 18, FPGA 20, memory 22, RFID devices 28A-28E, key manager module 50, input/output circuitry (hereinafter "I/O circuitry") 52, and power source 54. Although not explicitly shown in FIG. 2A, including processor 16, processor 18, FPGA 20, memory 22, RFID devices 28A-28E, key manager module 50, input/output circuitry (hereinafter "I/O circuitry") 52, and power source 54 may be electrically connected to each other, e.g., via electrically conductive traces of electronics card 14A. FIG. 2B is a schematic diagram of an example configuration of RFID device 28A, which, in the example shown in FIG. 2B, is an RFID reader, including integrated circuit (hereinafter "IC") 60 with processor 62 and memory 64. RFID device 28A also includes antenna 66.

In FIG. 2A, processor 16 may be configured as a CPU for electronics package 10 and is communicatively connected to memory 22 and I/O circuitry on electronics card 14A. Processor 18 is also communicatively connected to memory 22 and may be configured to perform any of a number of ancillary functions for electronics package 10 and/or in support of main processor 16, e.g., processor 18 may be configured as a graphics processor for a graphical display included in or connected to electronics package 10. FPGA 20 may be configured to execute specialized functions of electronics package 10. For example, FPGA 20 may be configured to execute navigation algorithms for an aircraft within which electronics package 10 may be employed.

Processors 16 and 18 may each include one or more processors, such as one or more microprocessors, DSPs, ASICs, FPGAs, or any other equivalent integrated or discrete logic circuitry, as well as any combinations of such components. As noted above, in some examples, either or both of processors 16 and 18 may include integrated circuits including processors and memory.

Memory 22 stores instructions for execution by processors 16 and 18 and other information related to the operation of electronics package 10 and tamper protection functions executed by various components of the package, e.g., configuration files for the package 10, individual components, and the like. Memory 22 may store include one or more memory modules constructed, e.g., as random access memory (RAM), read-only memory (ROM), non-volatile random access memory (NVRAM), electrically erasable programmable read-only memory (EEPROM), and/or FLASH memory. Processors 16 and 18, as well as other components of electronics package 10, may access memory 22 to, e.g., retrieve instructions for executing functions of package 10 as well as tamper protection measures in accordance with this disclosure, e.g. in accordance with the examples described with reference to FIG. 1.

Electronics card 14A also includes RFID devices 28A-28E associated with processor 16, processor 18, FPGA 20, memory 22, and electronics card 14A, respectively. As noted above, RFID devices 28A-28E may include a variety of different types of RFID devices, including RFID readers and tags, as well as passive, active, and battery-assisted RFID devices. For example, RFID device 28A may be configured as an RFID reader, while RFID devices 36 employed for virtual volume protection (FIG. 1) and RFID device 28E associated with electronics card 14A may be configured as RFID tags. Any combination of different types of RFID devices associated with components of electronics package 10 that function in accordance with examples of this disclosure may be employed.

As illustrated in FIG. 2B, RFID device 28A, which is an RFID reader in one example, includes IC 60 with processor 62 and memory 64 and RF antenna 66. RFID device 28A may be configured as an active RFID device powered by system power 54 of electronics card 14A. In another example, however, RFID device 28A may include an integrated power source, e.g., a battery, and thus function as a battery-assisted RFID reader. RFID device 28A is configured to transmit signals via RF antenna 66 to other RFID devices, e.g., to interrogate RFID tags such that the RFID tags will respond with a signal including the unique identification of the tag.

As RFID device 28A includes IC 60 with processor 62 and memory 64, in some examples, RFID device 28A may be configured to execute functions in addition to reading RFID tags included in electronics package 10. For example, RFID device 28A may be configured to carry out some tamper protection functions in accordance with examples of this disclosure. In one example, processor 62 in conjunction with memory 64 of RFID device 28A may be configured to communicate with RFID devices 36 via RF antenna 66 to authenticate the volume defined by chassis 12 of electronics package 10 is in accordance with a model configuration for the volume prescribed by an OEM of the package.

Processor 62 of RFID device 28A may also be configured to communicate with RFID devices 28B-28E, 30A-30C, 32, and 34 via RF antenna 66 to execute one or more levels of component configuration authentication for processor 18, FPGA 20, memory 22, electronics card 14A, processor 24, memory 26, electronics card 14B, electronics card 14C, and electronics card 14D, respectively. Memory 64 of RFID device 28A may store information used by processor 62 to authenticate the configuration of electronics package 10, including information related to the model virtual volume (e.g., the virtual volume when package 10 has not been tampered with) of the package defined by RFID devices 36 and/or configuration files employed to authenticate the presence and configuration of one or more of the components of the package.

Other RFID devices on electronics card 14A, as well as included in package 10 as a whole, may include more or less functional capabilities as described above with reference to RFID device 28A. For example, RFID device 28E may be a passive RFID tag, which is configured to draw power from a signal sent from an RFID reader in proximity to the tag and to respond to the reader with its own unique identification code, i.e., the unique identification code for RFID device 28E.

In the example shown in FIG. 2A, electronics card 14A also includes key manager module 50, which may be configured to receive a number of key splits from processors 16 and 18, FPGA 20, and memory 22 on electronics card 14A, as well as other components of electronics package 10, and assemble the key splits to generate an encryption/decryption key for encrypting and decrypting configuration files associated with individual components and/or electronics package 10 as a whole. Key manager module 50 may be implemented in whole or in part in software, hardware, or combinations thereof. In one example, key manager module 50 may be implemented as various electronic hardware components, including, e.g., DSPs, ASICs, FPGAs, and memory. In another example, key manager module 50 is illustrated in FIG. 2A only as a logical component of electronics card 14A and is implemented as instructions and data stored on memory 22 and executed by any one or more of processors 16 and 18 and FPGA 20. Additionally, in one example, a key manager module employed in examples according to this disclosure may be implemented on or associated with other components of electronics package 10 than those illustrated in FIG. 2A with reference to electronics card 14A, such as with one or more other electronics cards 14 in addition to or instead of electronics card 14A.

I/O circuitry 52 may include a variety of electronic components and circuitry for various I/O devices that may be included in or connected to electronics package 10, including, e.g. user input devices like a mouse, pointing device, or touchscreen and output devices like graphical or other displays and peripheral devices like printers.

Power source 54 includes circuitry and other components configured to generate power for one or more of components on electronics card 14A, and, in one example, other components of electronics package 10. For example, power source 54 may include an AC/DC adapter for connecting electronics package 10 to an AC power source. Power source 54 may also include power management circuitry and, in some examples, primary source and/or rechargeable batteries, e.g. to power volatile memory when electronics package 10 is not connected to an external power source.

Processors 16 and 18, FPGA 20, and memory 22 and any other components of electronics package employed or included in tamper protection functions in accordance with examples of this disclosure, may be configured to communicate with one another in a variety of ways. Any of RFID devices 28A-28E, 30A-30C, 32, 34, and 36 may be employed as mechanisms for wireless communications between components of electronics package 10. Additionally, in the example of electronics card 14A in FIG. 2A, various components on the card may be directly connected to one another on the card. For example, processors 16 and 18 may be directly connected to memory 22. Additionally, any of processor 16, processor 18, FPGA 20, and memory 22 may be directly connected with RFID devices 28A-28D, respectively.

In some examples, communications between components of electronics package 10, including between processors 16 and 18, FPGA 20, and memory 22 on electronics card 14A may be configured to be protected with vary levels and types of protection. For example, inter-component communications between any of processors 16 and 18, FPGA 20, and memory 22 on electronics card 14A may include the exchange of pass keys prescribed by the OEM of the card and associated with the correct versions of the components according to a model configuration. This may enable a first component of electronics package 10 to confirm the authenticity of another component attempting to communicate with the first component. In one example, processor 16 may transmit a validation message to processor 18 after authenticating its own configuration using a decrypted configuration file. The validation message, in order to be accepted and acted upon by processor 18, may include a pass key prescribed by the OEM of electronics card 14A for inter-component communications. In another example, inter-component communications may be encrypted and various component combinations may be configured to encrypt and decrypt messages with encryption keys stored in memory of electronics package 10.

Various mechanisms and standards may be employed for inter-component communication on electronics card 14A and between other components of electronics package 10. For example, information exchanged between any of processors 16 and 18, FPGA 20, and memory 22 on electronics card 14A may be in software readable, Joint Test Action Group (hereinafter "JTAG") readable, or hardware-to-hardware readable form and may be transmitted as described above via secure links between the components.

The foregoing description of the configuration and arrangement of electronics card 14A with respect to the types of components and interconnections therebetween is equally applicable to other groups of components of electronics package 10, e.g., electronics cards 14B-14D. Additionally, electronics cards 14A-14D and components thereof may be interconnected to one another, including wirelessly connected via any of RFID devices 28A-28E, 30A-30C, 32, and 34 or other wireless communication components included in package 10, as well as directly, e.g., via a card rack with inter-card electrical connections.

Figure 3:
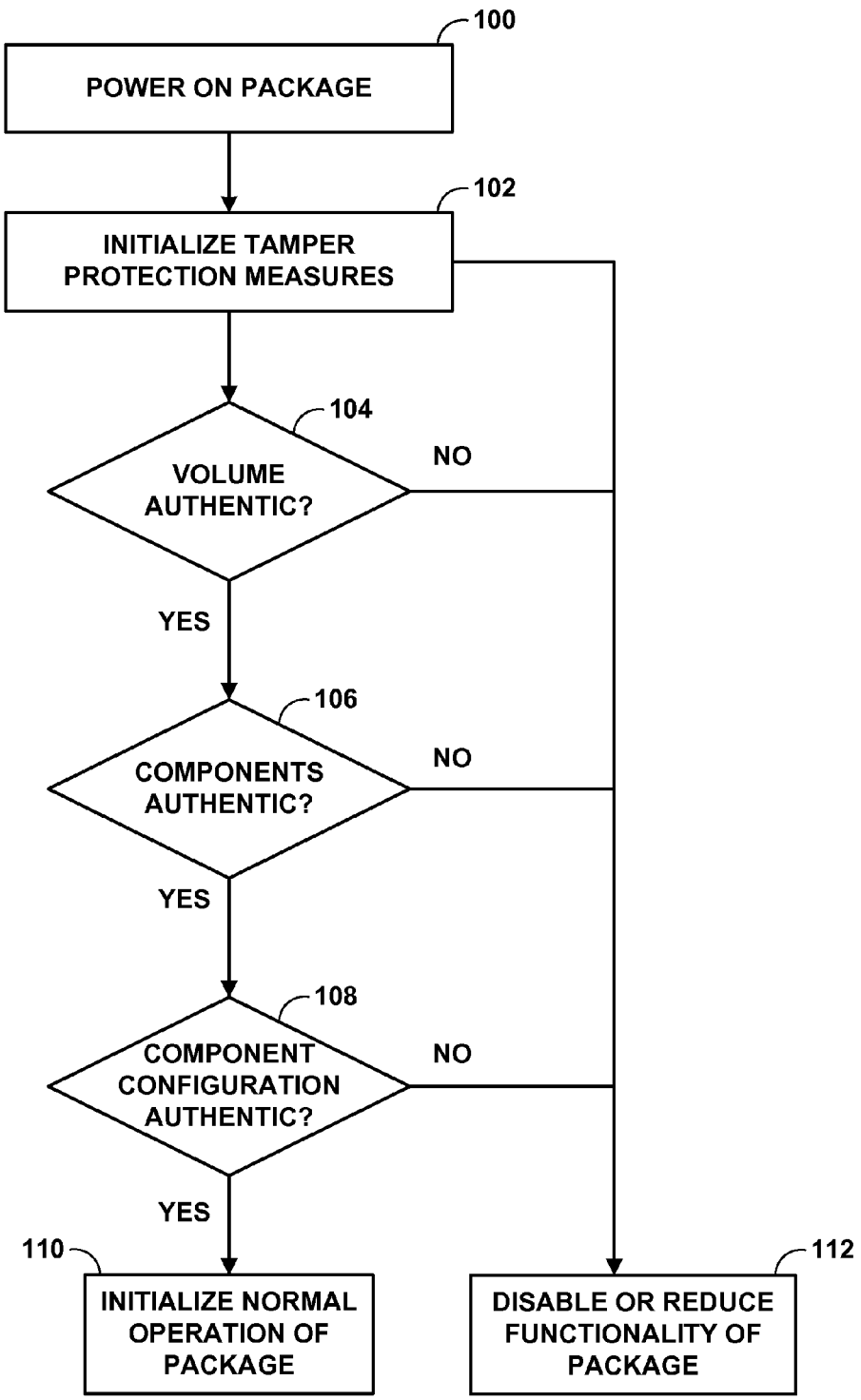
FIGS. 3-6 are flow charts illustrating an example method of protecting a package against tampering.

FIGS. 3-6 are flow charts illustrating different parts of an example method of protecting a package against tampering. The example method illustrated in FIGS. 3-6 combines all of the foregoing examples into a single process for protecting an electronics package against tampering. For example, as illustrated in FIG. 3, the example method includes techniques for authenticating the integrity of the physical volume defined by a package, the presence of the correct components within the package, and the configuration of each of the components. However, as noted above, any of the disclosed examples may be employed independently of other examples. Additionally, examples according to this disclosure may be combined in different combinations and implemented in different orders than described with reference to FIGS. 3-6. The method of FIGS. 3-6 is described in the context of protecting electronics package 10 against tampering. However, the functions described with reference to the example method of FIGS. 3-6 may be applied to other types of packages.

FIG. 3 is a flow chart illustrating an example method of protecting a package against tampering. The method of FIG. 3 includes powering on (also referred to herein as "powering up") the package (100), initializing tamper protection measures (102), authenticating the volume defined by the package (104), authenticating the presence of the correct components of within the package (106), authenticating the configuration of the components of the package (108), and at least one of initializing normal operation of the package (110) or disabling operation of the package or setting the package to operate in a reduced functionality mode (112).

In some examples, tamper protection measures executed by electronics package 10 will be initiated upon powering on the package. Powering on package 10 may include connecting power source 54 (FIG. 2A) of the package to an AC power source and turning on the package to employ the package for its intended use or interact with the package for other purposes, e.g., testing or calibration. In some examples, however, electronics package 10 may include one or more batteries by which the package may execute tamper protection measures according to this disclosure even when the package has not been turned on. Additionally, although some of the examples have been described as executed upon turning on electronics package 10, any of the tamper protection measures described in this disclosure may also be executed periodically over a period of time during which the package is turned on, including after the initial powering on of the package.

Different tamper protection measures in accordance with this disclosure may be implemented in a multitude of combinations and combined in a multitude of different ways. As such, in some examples, one or more devices of electronics package 10 may be configured to initialize a tamper protection process, which may, e.g., select the different types of tamper protection to execute and the order in which to execute them. The initialization process and component(s) of electronics package 10 executing the process may be preconfigured, e.g., by the OEM of the package or may be programmable/configurable by any authorized personnel at one or more times over the operational lifetime of the package.

In one example, processor 16 of electronics package 10 functions as a CPU for the package and is configured to initialize the tamper protection measures automatically executed by the package. Processor 16 may select from a menu of available tamper protection measures and select one of the selected measures to execute first, second, and so on. In one example, processor 16 selects volume, component, and component configuration protection and begins by authenticating the volume defined by electronics package 10.

Figure 4:
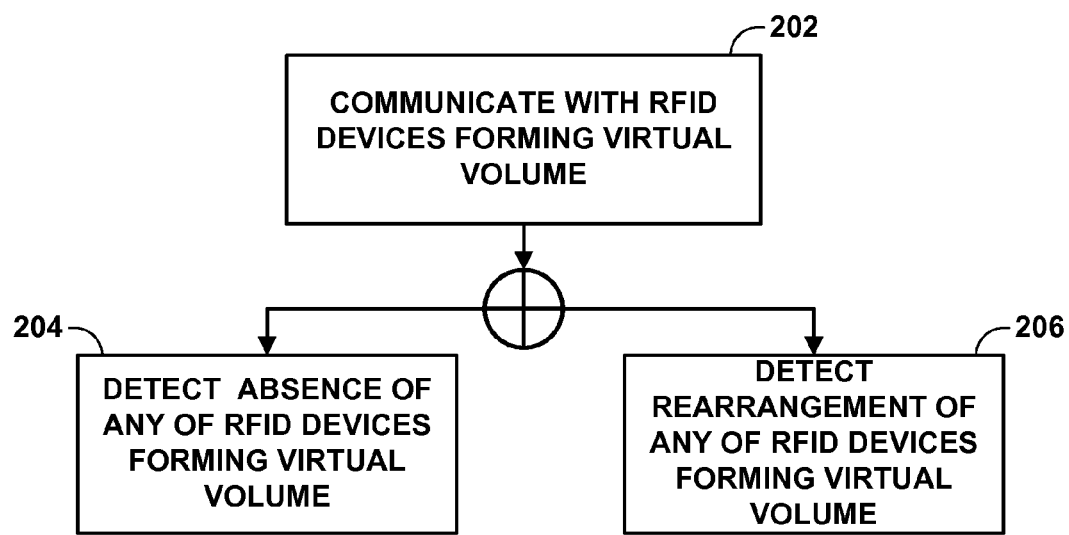

In one example, processor 16 initiates the authentication of the physical volume of electronics package 10 by executing or causing to be executed the functions outlined in the flow chart of FIG. 4, which includes communicating with RFID devices 36 (202) and detecting the absence of any of a list of RFID devices defined in a model configuration as associated with chassis 12 of electronics package 10 (204) or detecting that the locations of any of RFID devices 36 are different than a plurality of predetermined locations defined in the model configuration for the RFID devices (206).

In one example, after processor 16 initializes the tamper protection measures, processor 62 of RFID device 28A may be configured to automatically authenticate that the virtual volume defined by RFID devices 36 is in compliance with the volume of electronics package defined in the model configuration of the package. For example, processor 62 of RFID device 28A may communicate with RFID devices 36 associated with chassis 12 via RF antenna 66 (202). As an example, processor 62 of RFID device 28A may transmit signals to RFID devices 36 via antenna 66 to request that devices 36 respond with the unique identification code for each of the devices. In such an example, processor 62 of RFID device 28A may receive the unique identification code of each of RFID devices 36 and store the information temporarily or permanently in memory 64 of RFID 28A.

Processor 62 of RFID device 28A may compare the unique identification codes of each of RFID devices 36 against a configuration file including the identification codes of the RFID devices associated with chassis 12 in the model configuration of electronics package 10 prescribed by the OEM. In one example, processor 62 may retrieve the configuration file from memory 64 of RFID device 28A. However, in another example, processor 62 may retrieve the configuration file from other locations/memory, including, e.g., memory 22 on electronics card 14A, memory 26 on electronics card 14B or another memory source of electronics package 10.

In addition to or in lieu of detecting the absence of any of RFID devices 36 (204), processor 62 of RFID device 28A may be configured to determine if RFID devices 36 are arranged in the correct locations defined in the model configuration prescribed by the OEM of electronics package 10 (206). The location of RFID devices 36 can be determined using a number of techniques, including, e.g., triangulating the position of each of RFID devices 36 using a plurality of other RFID devices included in electronics package 10 and analyzing the power signature or other characteristics of signals transmitted between each of RFID devices 36 and another RFID device of electronics package 10, e.g., the time it takes for one of RFID devices 36 to respond to a signal sent to the device by another RFID device.

Regardless of the particular manner in which processor 62 and/or other processing devices of electronics package 10, e.g., processors included in RFID devices 28B and 30A, determine the actual location of each of RFID devices 36, in one example, processor 62 may compare the actual locations of RFID devices 36 to predetermined locations of a list of RFID devices defined in the model configuration as associated with chassis 12 of electronics package 10. The locations prescribed by the model configuration may be included in the configuration file, which processor 62 may retrieve from memory 64 or another memory/location of electronics package 10. Based on the comparison, processor 62 may determine if the virtual volume of electronics package 10 defined by RFID devices 36 is in compliance with the arrangement defined in the model configuration prescribed by the OEM of the package.

Referring again to the example method illustrated in FIG. 3, if processor 16 determines, e.g., using the technique shown in FIG. 4, that the virtual volume of package 10 is not authentic (104), e.g., because the absence of an RFID device 36 forming the virtual volume is detected (204) or because a rearrangement of one or more of the RFID devices 36 is detected (206), processor 16 may disable or reduce the functionality of one or more components (e.g., all of the components or a critical component, such as processor 16) of package 10 (112).

On the other hand, if processor 16 determines that tampering with package 10 is not detected on the volume level, i.e., the virtual volume is authentic (104), electronics package 10 may determine whether package 10 has been tampered with on a smaller scale. For example, electronics package 10 may be configured to protect against tampering by authenticating one or more of the components included in the package (106), e.g., by determining that the components of the package are the particular components defined in the model configuration for the package by the OEM. In one example, processor 62 of RFID device 28A, alone or in conjunction with one or more devices of electronics package 10, is configured to authenticate the components of electronics package 10 employing the functions illustrated in the flow chart of FIG. 5, which includes communicating with the RFID devices associated with the components (302), and detecting the absence of one or more of the components based on the communications with the RFID devices (304).

As noted above with reference to the example of FIG. 1, electronics package 10 may include an array of RFID devices respectively associated with different components of the package including cards 14, processors 16, 18, and 24, FPGA 20, memory 22, and memory 26. For example, in the example shown in FIG. 1, RFID device 28A is associated with processor 16 on electronics card 14A, RFID device 28B is associated with processor 18 on electronics card 14A, RFID device 28C is associated with FPGA 20 on electronics card 14A, RFID device 28D is associated with memory 22 on electronics card 14A, and RFID device 28E is associated with electronics card 14A. Additionally, RFID device 30A is associated with processor 24 on electronics card 14B, RFID device 30B is associated with memory 26 on electronics card 14B, and RFID device 30C is associated with electronics card 14B.

RFID device 32 is associated with electronics card 14C and RFID device 34 is associated electronics card 14D.

In one example, RFID devices 28A-28E, 30A-30C, 32, and 34 associated with processors 16 and 18, FPGA 20, memory 22, electronics card 14A, processor 24, memory 26, electronics card 14B, electronics card 14C, and electronics card 14D, respectively, are employed to authenticate the actual components of electronics package 10 are in compliance with the components defined in the model configuration prescribed by the OEM. For example, processor 64 of RFID device 28A may be configured to communicate with RFID devices 28A-28E, 30A-30C, 32, and 34 (302) and determine if one or more of the components associated with the RFID devices has been tampered with based on the communications. In one example, processor 64 of RFID device 28A transmits signals to RFID devices 28B-28E, 30A-30C, 32, and 34 via RF antenna 66 to request that each RFID device respond with the unique identification code for that device. In such an example, processor 64 may receive the unique identification code of each of RFID devices 28B-28E, 30A-30C, 32, and 34 and store the codes temporarily or permanently in memory 64 of RFID device 28A.

Processor 64 may compare the unique identification codes of each of RFID devices 28B-28E, 30A-30C, 32, and 34 against a configuration file including the identification codes of the RFID devices associated with processor 18, FPGA 20, memory 22, electronics card 14A, processor 24, memory 26, electronics card 14B, electronics card 14C, and electronics card 14D in the model configuration of electronics package 10 prescribed by the OEM. In one example, processor 64 retrieves the configuration file from memory 64 of RFID device 28A. However, in another example, processor 64 retrieves the configuration file from other locations/memory, including, e.g., memory 22, memory 26, or another memory source of electronics package 10. In any event, processor 16 may determine based on the comparison between the unique identification codes of each of each of RFID devices 28B-28E, 30A-30C, 32, and 34 received from RFID device 28A and the identification codes of the RFID devices in the model configuration whether one or more RFID devices prescribed by the model configuration are completely missing or have been substituted with other, e.g., used or counterfeit RFID devices. In one example, such missing or substituted RFID devices indicated by the comparison executed by processor 16 may be interpreted as unauthorized tampering with package 10.

Either before or after processor 64 of RFID device 28A communicates with RFID devices 28B-28E, 30A-30C, 32, and 34, processor 64 may also authenticate the unique identification code for RFID device 28A against the code in the configuration file that includes the model configuration of electronics package 10 prescribed by the OEM. As this process includes RFID device 28A authenticating itself, in one example, another processing device of electronics package 10 may communicate with RFID device 28A to request the unique identification code for that device and authenticate this code against the code in a configuration file that includes the model configuration of electronics package 10 prescribed by the OEM.

In the foregoing manner, the unique hardware identification codes of each of RFID devices 28A-28E, 30A-30C, 32, and 34 are employed to serialize the associated components of electronics package 10, processor 16, processor 18, FPGA 20, memory 22, electronics card 14A, processor 24, memory 26, electronics card 14B, electronics card 14C, and electronics card 14D. In other words, the unique identification code of each RFID device associated with each component of electronics package 10 is employed as a proxy to uniquely identify that component.

Figure 5:
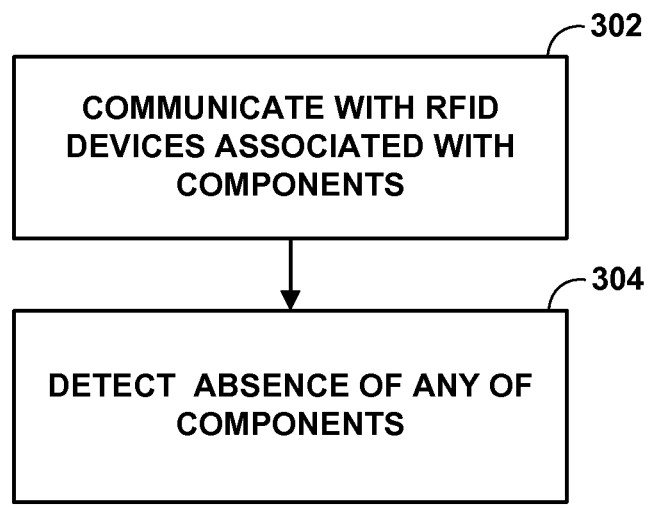
Figure 6:
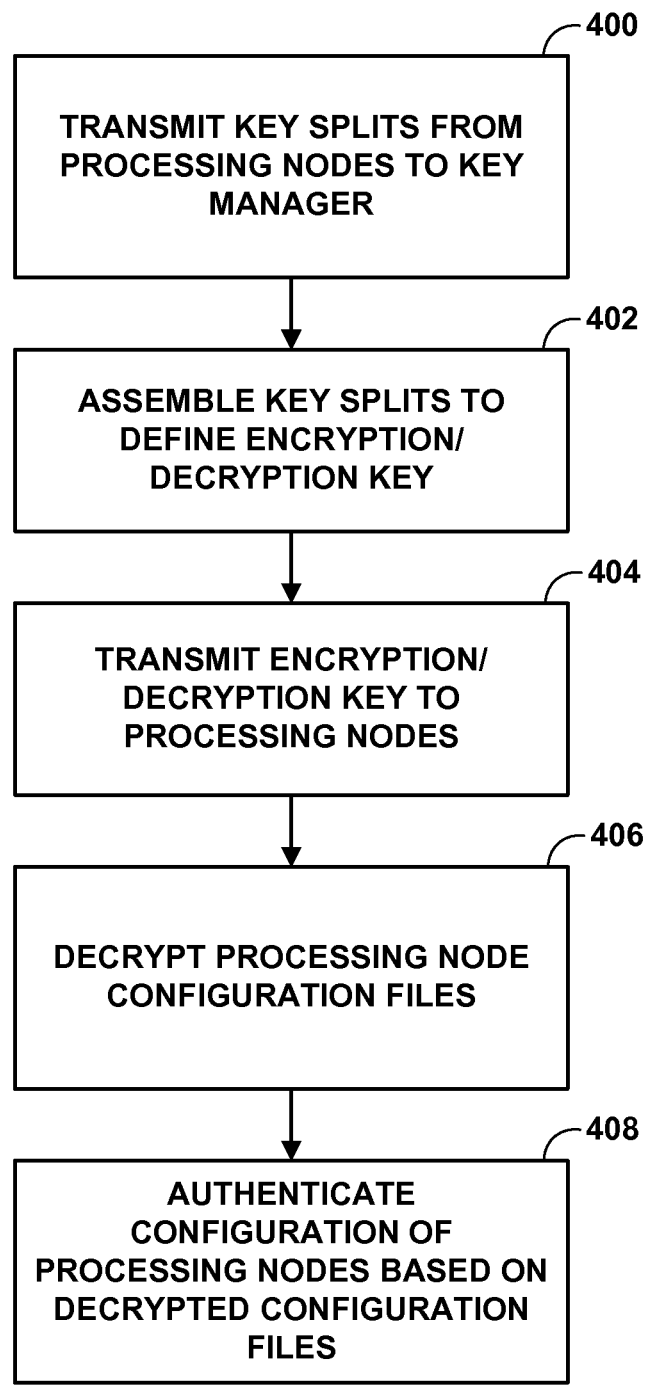

Referring again to the example method illustrated in FIG. 3, if processor 16 determines, e.g., using the technique shown in FIG. 5, that one or more components of package 10 are not authentic (106), e.g., because the absence of a component of package 10 is detected (304), processor 16 may disable or reduce the functionality of one or more components (e.g., all of the components or a critical component, such as processor 16) of package 10 (112).

On the other hand, if processor 16 determines that tampering with package 10 is not detected based on the authenticity of components (e.g., the absence of one or more components may indicate a lack of authenticity) (106), electronics package 10 may determine whether package 10 has been tampered by authenticating the operational configuration of one or more of the components included in the package, e.g., by determining that one or more of a number of operational parameters by which the components of the package are configured to function are the same as the parameters defined in the model configuration for the package by the OEM. In one example, processor 62 of RFID device 28A, alone or in conjunction with one or more devices of electronics package 10, is configured to authenticate the configuration of components of electronics package 10 in a similar manner as described above for authenticating the components, e.g. by requesting not only identification codes from each RFID device, but also configuration settings for each of the components associated with the RFID devices and then comparing the actual configuration of the components to a configuration settings in a configuration file including the model configuration prescribed by the OEM.

In another example, however, specific operational configuration settings for some components of electronics package 10, e.g., for processing nodes including one or more of processors 16, 18, and 24 and FPGA 20 may be stored in encrypted configuration files, which must be decrypted before being employed to authenticate the configuration of the components as in compliance with the model configuration. As such, in one example, one or more processing devices of electronics package 10 are configured to authenticate the configuration of components of electronics package 10 employing the functions illustrated in the flow chart of FIG. 6, which includes transmitting a key split from each of a number of processing nodes of electronics package 10 to a key manager module 50 (FIG. 2A) (400), assembling the key splits of the processing nodes to define an encryption/decryption key (402), transmitting the encryption/decryption key from the key manager module 50 to the processing nodes (404), decrypting a configuration file associated with each of the processing nodes with the encryption/decryption key (406), and authenticating a configuration of one or more of the processing nodes based on one or more of the decrypted configuration files (408).

In one example, after the components of electronics package have been authenticated (106) as described above, RFID devices 28A-28C, and 30A respectively associated with processors 16 and 18, FPGA 20, and processor 24 may transmit the unique identification codes for each of the RFID devices to each of the components of electronics package 10. Processors 16 and 18, FPGA 20, and processor 24 may be included in a number of processing nodes of electronics package 10 and, in one example, each of processors 16 and 18, FPGA 20, and processor 24 may employ the unique identification code of each of the RFID devices associated with each component as the key split that the devices transmit to key manager module 50 (see FIG. 2A).

Key manager module 50 of electronics package 10 may assemble the key splits of processors 16, 18, and 24, and FPGA 20 to define an encryption/decryption key. In one example, assembling the key splits of processors 16, 18, and 24, and FPGA 20 may include concatenating the key splits of each component to define the encryption/decryption key. In another example, key manager module 50 may execute another algorithm that employs the key splits of processors 16, 18, and 24, and FPGA 20 to define the encryption/decryption key, e.g., the algorithm generates an encryption/decryption key that is based on but does not necessarily include the key splits of the individual components of the package. Key manager module 50 may then transmit the encryption/decryption key to each of processors 16, 18, and 24, and FPGA 20 to enable each processing node to decrypt the respective configuration files for each node.

In one example, key manager module 50 generates and transmits the encryption/decryption key to processor 16. Processor 16 employs the key to decrypt a configuration file stored on memory 22, which includes information related to a model configuration for processor 16 prescribed by the OEM of electronics package 10. After decrypting the configuration file, processor 16 compares the current configuration of the processing node including processor 16 to the configuration information included in the decrypted configuration file to determine if the processing node including processor 16 is in compliance with the model configuration prescribed by the OEM. For example, processor 16 may determine any software loads executed during manufacture and/or service or repair of electronics package 10, software version and build numbers, component identification numbers, like serial numbers for the processing node, e.g. for processor 16 and memory 22. In the event processor 16 determines that the actual configuration of the processing node is in compliance with the model configuration as reflected in the decrypted configuration file, processor 16 may be configured to transmit a validation message to another processing node of electronics package 10 in order to cause another processing node to cross-check the authenticity of the configuration of the processing node including processor 16.

The validation message from processor 16 may include information that enables another processing node of electronics package 10 to cross-check the authenticity of the configuration of the processing node including processor 16. For example, all of the information determined by processor 16 regarding the actual configuration of the processing node including processor 16 may be transmitted in the validation message. Additionally, in some examples, the validation message and other communications between components of electronics package 10 may be secure. In such cases, the validation message from processor 16 may include a pass key or other credentials for secure inter-processing node communications.

In any event, the processing node to which processor 16 transmits the validation message may be configured to compare the actual configuration of the processing node including processor 16 to the model configuration included in the decrypted configuration file for that processing node to authenticate the configuration of the processing node including processor 16. For example, processor 16 may be configured to transmit the validation message to a processing node of electronics package 10 including FPGA 20. In this example, FPGA 20 may receive the validation message and first authenticate the message as from processor 16 by checking the pass key transmitted by processor 16 with the message. Assuming the correct pass key is provided in the validation message, FPGA 20 may compare the actual configuration of the processing node including processor 16 to a model configuration in accordance with information in a configuration file stored on memory associated with FPGA 20, which configuration file was previously decrypted by FPGA using the encryption/decryption key provided by the key manager module of electronics package 10. The processing node including FPGA 20 may thus be employed to cross-check the authenticity of the configuration of the processing node including processor 16. The foregoing process of authentication and cross-authentication of processing nodes of electronics package employing encrypted configuration files decrypted by a key assembled from key splits from each processing node may be repeated as necessary to authenticate the configuration of all of the processing nodes of electronics package 10, e.g. all of the processing nodes including processors 16, 18, and 24, and FPGA 20.

Referring again to FIG. 3, the example method illustrates that if any of the foregoing tamper protection measures automatically executed by various devices included in electronics package 10 indicates that the package has been tampered with, one or more devices, e.g., one or more processing devices of the package may execute one or more functions in response to the detection of possible tampering with electronics package 10. For example, processor 16 and/or another processing device may disable operation of one or more of the components of electronics package 10 or set one or more of the components of the package to operate in a reduced functionality mode (112) in response to detecting the removal or rearrangement of any of RFID devices 36 associated with chassis 12, the absence of any of the correct components of package 10, or that the configuration of any of the components of package 10 does not comply with the configurations specified in the model configuration for the package prescribed by the OEM. In one example, processor 16 may also be configured to trigger an audible, visual, or tactile notification indicating that the actual configuration of electronics package 10 is out of compliance with the model configuration prescribed by the OEM in response to any one or more of the foregoing conditions being detected.

In the event that the volume, components, and component configurations of electronics package 10 are authenticated and it is determined that the actual configuration of package 10 complies with the model configuration prescribed by the OEM, one or more devices of the package may initialize normal operation of the package such that it may function according to its intended use (110).

Many of the foregoing examples of tamper protection of electronics package 10 include or require communications between different sets of RFID devices in an array of such devices included in the package. To reduce interference with communications between different RFID devices of electronics package 10, any of a number of wireless communication techniques may be employed to reduce or eliminate such interference. For example, one or more of the RFID devices of electronics package 10 may be configured to employ the Aloha method, either pure or slotted to reduce communication collisions between different sets of the RFID devices.

Examples according to this disclosure may be combined in a variety of different ways to provide varying levels of tamper protection for sensitive packages. In one example, the features described with reference to FIG. 6 regarding specific operational configuration settings for some components of an electronics package, e.g., for processing nodes of the package stored in encrypted configuration files may be employed independent of the other tamper protection measures described above.

In one example, a method includes initializing a plurality of processing nodes respectively associated with a plurality of components of a package, transmitting a key split from each of the processing nodes to a key manager module executed by at least one processing device of the package, assembling, by the key manager module, a plurality of key spits of a threshold number of the processing nodes to define an encryption/decryption key, decrypting a configuration file associated with each of the processing nodes with the encryption/decryption key, and authenticating a configuration of one or more of the plurality of processing nodes based on one or more of the decrypted configuration files.

The foregoing example may also optionally include authenticating, by a first processing node of the plurality of processing nodes, configuration of the first processing node based on the decrypted configuration file for the first processing node, transmitting a validation message to a second processing node of the plurality of processing nodes, and authenticating, by the second processing node, the configuration of the first processing node based on at least one of the validation message and the decrypted configuration file for the second processing node.

Additionally, the example method may include authenticating, by the second processing node, configuration of the second processing node based on the decrypted configuration file for the second processing node, transmitting a validation message to a third processing node of the plurality of processing nodes, and authenticating, by the third processing node, the configuration of the second processing node based on at least one of the validation message and the decrypted configuration file for the third processing node.

Functions executed by processors 16, 18, and 24, and FPGA 20 or any other components described herein may be implemented, at least in part, by hardware, software, firmware or any combination thereof. For example, various aspects of the techniques may be implemented within one or more processors, including one or more microprocessors, DSPs, ASICs, FPGAs, or any other equivalent integrated or discrete logic circuitry, as well as any combinations of such components, embodied in electronics included in electronics package 10 or another device. The term "processor" or "processing circuitry" may generally refer to any of the foregoing logic circuitry, alone or in combination with other logic circuitry, or any other equivalent circuitry.

Such hardware, software, firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, functionality ascribed to processors 16, 18, and 24, and FPGA 20 and other components described above, devices and techniques may be embodied as instructions on a computer-readable medium such as RAM, ROM, NVRAM, EEPROM, FLASH memory, magnetic data storage media, optical data storage media, or the like. The instructions may be executed to support one or more aspects of the functionality described in this disclosure. The computer-readable medium may be nontransitory.

Various examples have been described. These and other examples are within the scope of the following claims.

What is claimed is:

1. A package comprising:
a chassis;
a plurality of components arranged within the chassis;
a plurality of RFID devices arranged at a plurality of locations to form an array configured to authenticate compliance of an actual configuration of the package with a model configuration;
at least one processing device configured to communicate with the RFID devices, determine if the actual configuration of the package is in compliance with the model configuration based on communications with the RFID devices, and set an operational mode of one or more of the components of the package in response to determining if the actual configuration of the package is in compliance with the model configuration.

2. The package of claim 1, wherein the actual configuration of the package comprises a configuration of the chassis.

3. The package of claim 2, wherein a subset of the plurality of RFID devices are arranged at a plurality of locations on the chassis to form a virtual volume that simulates a physical volume defined by the chassis.

4. The package of claim 3, wherein the at least one processing device is configured to communicate with the subset of RFID devices and determine if the subset of RFID devices that form the virtual volume are in compliance with the model configuration of the package.

5. The package of claim 4, wherein the at least one processing device is configured to determine if the subset of RFID devices that form the virtual volume are in compliance with the model configuration of the package at least by detecting at least one of the absence of any of a list of RFID devices defined in the model configuration as associated with the chassis or that locations of any of the subset of RFID devices are different than a plurality of predetermined locations defined by the model configuration for the subset of RFID devices.

6. The package of claim 5, wherein the at least one processing device is configured to detect absence of any of the subset of RFID devices defined in the model configuration as associated with the chassis at least by:
requesting a unique identification code from each of the subset of RFID devices;
receiving the unique identification codes of each of the subset of RFID devices from each RFID device; and
comparing the unique identification codes of each of the subset of RFID devices to a list of codes defined in the model configuration.

7. The package of claim 6, wherein the at least one processing device requests and receives the unique identification codes of each of the subset of RFID devices via at least one of the plurality of RFID devices not included in the subset of RFID devices.

8. The package of claim 1, wherein the actual configuration of the package comprises the configuration of one or more of the components within the chassis.

9. The package of claim 8, wherein a subset of the plurality of RFID devices are associated with the plurality of components such that each RFID device of the subset of RFID devices is associated with at least one of the plurality of components.

10. The package of claim 9, wherein the at least one processing device is configured to communicate with the subset of RFID devices and detect the absence of one or more of the plurality of components within the chassis based on the communication with the subset of RFID devices.

11. The package of claim 10, wherein the at least one processing device is configured to detect the absence of the one or more of the plurality of components at least by:
requesting a unique identification code from each of the subset of RFID devices;
receiving the unique identification codes of each of the subset of RFID devices from each RFID device; and
comparing the unique identification codes of each of the subset of RFID devices to a list of codes defined in the model configuration.

12. The package of claim 11, wherein the at least one processing device requests and receives the unique identification codes of each of the subset of RFID devices via at least one of the plurality of RFID devices not included in the subset of RFID devices.

13. The package of claim 9, wherein the at least one processing device is configured to communicate with the subset of RFID devices and determine if an actual operational configuration of each of the plurality of components is in compliance with the model configuration for the package.

14. The package of claim 13, wherein the at least one processing device is configured to determine if the actual operational configuration of each of the plurality of components is in compliance with the model configuration for the package at least by:
requesting, for each of the plurality of components, data defining the actual operational configuration of the component from an RFID device from the subset of RFID devices associated with the component;
receiving, for each of the plurality of components, the actual operational configuration from the RFID device from the subset of RFID devices associated with the component; and
comparing, for each of the plurality of components, the actual operation configuration of the component to a model operational configuration for the component defined in the model configuration for the package.

15. The package of claim 1, further comprising:
a plurality of processing nodes, each processing node comprising a processing device, one of which is the at least one processing device, and memory; and
a key manager module comprising instructions stored on the memory of at least one of the processing nodes and executable by at least one of the processing devices of the processing nodes,
wherein each of the of processing nodes is configured to transmit a key split to the key manager module,
wherein the key manager module is configured to assemble a plurality of key splits from a threshold number of the processing nodes to define an encryption/decryption key and transmit the encryption/decryption key to each of the processing nodes,
wherein each of the processing nodes is configured to decrypt a configuration file associated with each processing node with the encryption/decryption key,
wherein at least one of the processing nodes is configured to authenticate a configuration of one or more of the processing nodes based on one or more of the decrypted configuration files.

16. The package of claim 14,
wherein a first processing node selected from the plurality of processing nodes is configured to authenticate a configuration of the first processing node based on the decrypted configuration file for the first processing node and transmit a validation message to a second processing node selected from the plurality of processing nodes, and
wherein the second processing node selected is configured to authenticate the configuration of the first processing node based on at least one of the validation message and the decrypted configuration file for the second processing node.

17. The package of claim 16,
wherein the second processing node is configured to authenticate configuration of the second processing node based on the decrypted configuration file for the second processing node and transmit a validation message to a third processing node selected from the plurality of processing nodes, and
wherein the third processing node is configured to authenticate the configuration of the second processing node based on at least one of the validation message and the decrypted configuration file for the third processing node.

18. The package of claim 1, wherein the processing device is configured to at least one of disable operation of one or more of the components of the package or set one or more of the components of the package to operate in a reduced functionality mode in response to determining that the actual configuration of the package is out of compliance with the model configuration.

19. A method comprising:
communicating with a plurality of RFID devices arranged at a plurality of locations on or within a chassis of a package, wherein the plurality of RFID devices form an array configured to authenticate compliance of an actual configuration of the package with a model configuration;
determining if the actual configuration of the package is in compliance with the model configuration based on communications with the RFID devices; and
setting an operational mode of one or more components of the package in response to determining if the actual configuration of the package is in compliance with the model configuration.

20. A non-transitory computer-readable storage medium includes instructions executable by a programmable processor to cause the processor to:
communicate with a plurality of RFID devices arranged at a plurality of locations on or within a chassis of a package to form an array configured to authenticate compliance of an actual configuration of the package with a model configuration;
determine if the actual configuration of the package is in compliance with the model configuration based on communications with the RFID devices; and
set an operational mode of one or more components of the package in response to determining if the actual configuration of the package is in compliance with the model configuration.

* * * * *